US012118843B2

(12) United States Patent
Hall et al.

(10) Patent No.: US 12,118,843 B2
(45) Date of Patent: *Oct. 15, 2024

(54) PROVIDING DIGITAL IDENTIFICATIONS GENERATED FOR CHECKPOINT VALIDATION BASED ON BIOMETRIC IDENTIFICATION

(71) Applicant: Secure Identity, LLC, New York, NY (US)

(72) Inventors: Sam Hall, New York, NY (US); Kenneth Cornick, New York, NY (US)

(73) Assignee: SECURE IDENTITY, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,648

(22) Filed: Nov. 28, 2023

(65) Prior Publication Data
US 2024/0096153 A1    Mar. 21, 2024

Related U.S. Application Data

(63) Continuation of application No. 17/690,381, filed on Mar. 9, 2022, now Pat. No. 11,869,294.

(51) Int. Cl.
| | |
|---|---|
| G07C 9/26 | (2020.01) |
| G07C 9/00 | (2020.01) |
| G07C 9/28 | (2020.01) |
| H04W 4/021 | (2018.01) |
| H04W 4/80 | (2018.01) |

(52) U.S. Cl.
CPC ........... *G07C 9/26* (2020.01); *G07C 9/00309* (2013.01); *G07C 9/00896* (2013.01); *G07C 9/28* (2020.01); *H04W 4/021* (2013.01); *H04W 4/80* (2018.02); *G07C 2009/00769* (2013.01); *G07C 2209/63* (2013.01)

(58) Field of Classification Search
None
See application file for complete search history.

(56) References Cited

U.S. PATENT DOCUMENTS

| | | |
|---|---|---|
| 8,381,969 B1 | 2/2013 | Miller et al. |
| 8,423,462 B1 | 4/2013 | Amacker et al. |
| 8,521,131 B1 | 8/2013 | Ramalingam et al. |

(Continued)

*Primary Examiner* — K. Wong
(74) *Attorney, Agent, or Firm* — Brownstein Hyatt Farber Schreck, LLP

(57) ABSTRACT

An identification systems maintains digital identities for people and uses such digital identities to generate and/or provide one or more digital identification objects to one or more checkpoints. Such digital identification objects may be generated on the fly using identity information stored in association with the digital identities, stored, and so on. The identification system may generate the digital identification object in a format expected by the checkpoint, may have a trusted relationship with the checkpoint and/or may be configured to securely communicate with the checkpoint, and so on. In this way, the identification system may enable use of the automated and/or semi-automated checkpoints discussed above without requiring that people have a mobile driver's license and/or other government-issued digital identification stored on a mobile device that is capable of communicating with the automated and/or semi-automated checkpoints.

20 Claims, 13 Drawing Sheets

(56) References Cited

U.S. PATENT DOCUMENTS

| | | |
|---|---|---|
| 8,744,966 B1 | 6/2014 | Amacker et al. |
| 8,965,170 B1 | 2/2015 | Benea |
| 9,107,064 B1 | 8/2015 | Ramalingam et al. |
| 9,166,961 B1 | 10/2015 | Johansson et al. |
| 9,202,105 B1 | 12/2015 | Wang et al. |
| 9,324,098 B1 | 4/2016 | Agrawal et al. |
| 9,386,507 B1 | 7/2016 | Ramalingam et al. |
| 9,607,138 B1 | 3/2017 | Baldwin et al. |
| 9,609,577 B1 | 3/2017 | Ramalingam et al. |
| 9,681,350 B1 | 6/2017 | Marupaduga et al. |
| 9,681,359 B2 | 6/2017 | Ramalingam et al. |
| 9,723,131 B1 | 8/2017 | Ramalingam et al. |
| 9,836,642 B1 | 12/2017 | Ramaswamy |
| 9,842,441 B1 | 12/2017 | Mattern |
| 9,934,504 B2 | 4/2018 | Wang et al. |
| 9,967,250 B2 | 5/2018 | Johansson et al. |
| 10,027,662 B1 | 7/2018 | Mutagi et al. |
| 10,055,740 B2 | 8/2018 | Hanson et al. |
| 10,104,181 B1 | 10/2018 | Rao et al. |
| 10,108,791 B1 | 10/2018 | Masterman |
| 10,108,961 B2 | 10/2018 | Wang et al. |
| 10,122,727 B2 | 11/2018 | Johansson et al. |
| 10,235,669 B2 | 3/2019 | Amacker et al. |
| 10,242,364 B2 | 3/2019 | Wang et al. |
| 10,243,945 B1 | 3/2019 | Kruse et al. |
| 10,275,587 B2 | 4/2019 | Cornick et al. |
| 10,931,461 B2 | 2/2021 | Dilles et al. |
| 11,069,167 B2 | 7/2021 | Einberg et al. |
| 11,151,481 B1 | 10/2021 | Sun et al. |
| 11,182,774 B1 | 11/2021 | Boyd et al. |
| 11,206,544 B2 | 12/2021 | Boyd et al. |
| 11,538,126 B2 | 12/2022 | Vemury et al. |
| 11,869,294 B2 * | 1/2024 | Hall .................. G07C 9/26 |
| 2004/0221303 A1 | 11/2004 | Sie |
| 2014/0189720 A1 | 7/2014 | Terrazas |
| 2015/0294515 A1 | 10/2015 | Bergdale |
| 2016/0189063 A1 | 6/2016 | Nie |
| 2016/0380774 A1 | 12/2016 | Lovelock et al. |
| 2017/0188103 A1 | 6/2017 | Pan |
| 2018/0007060 A1 | 1/2018 | Leblang et al. |
| 2019/0036939 A1 | 1/2019 | Johansson et al. |
| 2019/0050631 A1 | 2/2019 | Hayase |
| 2021/0377742 A1 | 12/2021 | Boyd et al. |
| 2022/0262185 A1 | 8/2022 | Ellenbogen et al. |

\* cited by examiner

PROVIDING DIGITAL IDENTIFICATIONS GENERATED FOR CHECKPOINT VALIDATION BASED ON BIOMETRIC IDENTIFICATION

CROSS-REFERENCE TO RELATED APPLICATION(S)

This application is a continuation patent application of U.S. patent application Ser. No. 17/690,381, filed Mar. 9, 2022 and titled "Providing Digital Identifications Generated for Checkpoint Validation Based on Biometric Identification," the disclosure of which is hereby incorporated herein by reference in its entirety.

FIELD

The described embodiments relate generally to digital identification. More particularly, the present embodiments relate to providing a digital identification generated for a checkpoint validation based on a biometric identification.

BACKGROUND

Many different types of security screenings determine a person's identity and/or various information associated with that person's identity in order to determine whether or not a person is authorized for one or more actions. For example, bouncers at a club may compare a person to that person's identification token (such as a driver's license, state and/or federal and/or other identification card, passport, and so on) in order to verify whether or not the person is of a minimum age (such as 18 or 21 years of age) to enter the club. By way of another example, Transportation Security Administration personnel at an airport may compare a person to that person's identification token and/or compare that person's identification token to that person's boarding pass in order to verify whether or not the person has a flight at a particular airport on a particular day and allow or deny the person access accordingly.

In some cases, security screenings may be performed at one or more checkpoints. Such checkpoints may include one or more devices that may be used to facilitate determining whether or not the person is authorized for one or more actions. By way of example, an identification card scanning device may be used to evaluate whether the identification card is genuine or not. These devices may be used to speed the security screening process, improve the security screening process, ease the burden of the security screening process on security screening staff, make the security screening process more convenient for the people screened, and so on.

SUMMARY

The present disclosure relates to identification systems that maintain digital identities for people and use such digital identities to generate and/or provide one or more digital identification objects to one or more checkpoints. Such digital identification objects may be generated on the fly using identity information stored in association with the digital identities, stored, and so on. The identification system may generate the digital identification object in a format expected by the checkpoint, may have a trusted relationship with the checkpoint and/or may be configured to securely communicate with the checkpoint, and so on. In this way, the identification system may enable use of the automated and/or semi-automated checkpoints discussed above without requiring that people have a mobile driver's license and/or other government-issued digital identification stored on a mobile device that is capable of communicating with the automated and/or semi-automated checkpoints.

In various embodiments, a system includes at least one non-transitory storage medium that stores instructions and at least one processor. The at least one processor executes the instructions to determine that a person is located within an area, load a local biometric gallery with biometric information for the person, receive a digital representation of a biometric for the person, determine an identity for the person using the digital representation of the biometric and the local biometric gallery, generate a digital identification object for the person using identity information associated with the identity and provide the digital identification object to a checkpoint.

In some examples, the at least one processor loads the local biometric gallery with the biometric information from a main biometric gallery. In a number of implementations of such examples, the local biometric gallery is located remote from the main biometric gallery. In various implementations of such examples, the local biometric gallery is smaller than the main biometric gallery.

In various examples, the at least one processor determines that the person is located within the area using geofencing. In some examples, the at least one processor determines that the person is located within the area by determining that a mobile device associated with the person is proximate to the area. In a number of examples, the at least one processor determines that a mobile device associated with the person is proximate to the area using a wireless communication identifier received from the mobile device.

In some embodiments, a system includes at least one non-transitory storage medium that stores instructions and at least one processor. The at least one processor executes the instructions to receive a digital representation of a biometric for a person; determine an identity for the person using the digital representation of the biometric; determine digital identification object information to be included in digital identification objects according to at least one specification; determine a digital identification object format for the digital identification objects according to the at least one specification; generate a digital identification object for the person using identity information associated with the identity, the digital identification object information, and the digital identification object format; and provide the digital identification object to a checkpoint.

In various examples, the at least one processor stores the digital identification object. In some examples, the digital identification object format corresponds to a mobile driver's license format, a mobile state identification format, a mobile federal identification format, a mobile governmental identification format, or a mobile passport format. In a number of examples, the digital identification object includes an image of at least a portion of the person. In various examples, the digital identification object includes a name of the person. In some examples, the digital identification object includes an identification number associated with the person.

In a number of embodiments, a system includes at least one non-transitory storage medium that stores instructions and at least one processor. The at least one processor executes the instructions to receive a digital representation of a biometric for a person, determine an identity for the person using the digital representation of the biometric, generate a digital identification object for the person using identity information associated with the identity, and provide the digital identification object to a checkpoint. In various examples, the at least one processor provides the digital identification object to the checkpoint via a checkpoint backend. In some examples, the at least one processor provides the digital identification object to the checkpoint using near-field communication. In a number of examples, the at least one processor provides the digital identification object to the checkpoint using Bluetooth®.

In some examples, determining the identity for the person includes providing biometric information to an agent electronic device where at least some of the biometric information is associated with the person and receiving an indication of the identity from the agent electronic device. In various implementations of such examples, the biometric information includes digital representations of biometrics for multiple people. In a number of implementations of such examples, the digital representation of the biometric includes at least a portion of a facial image of the person captured while the person is in motion.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
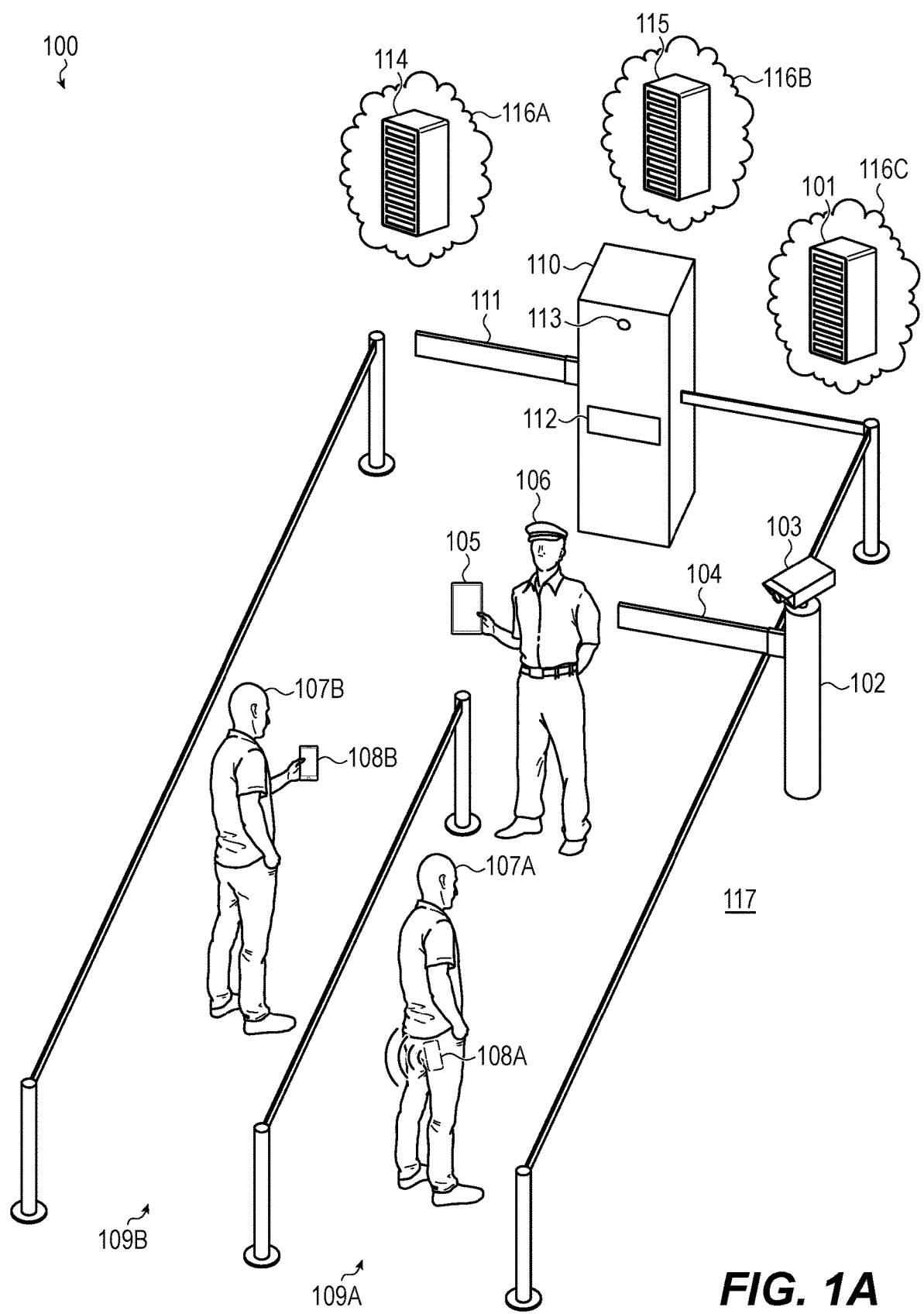
FIG. 1A depicts a first example system for providing a digital identification generated for a checkpoint validation based on a biometric identification.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

Security screenings may use automated and/or semi-automated checkpoints and/or similar devices and/or configurations. These automated and/or semi-automated checkpoints may be used to speed the security screening process, improve the security screening process, ease the burden of the security screening process on security screening staff, make the security screening process more convenient for the people screened, and so on.

By way of illustration, automated and/or semi-automated checkpoints may be capable of securely and/or otherwise communicating with mobile devices (such as one or more smart phones, tablet computing devices, smart watches, laptop computing devices, and so on) associated with a person (such as when the person "taps" the person's mobile device to a near-field communication or "NFC" reader associated with the automated and/or semi-automated checkpoints). This communication may allow the automated and/or semi-automated checkpoints to obtain a mobile driver's license and/or other government-issued digital identification (such as a mobile passport, a mobile state identification token, and so on) for the person stored by the mobile device. The automated and/or semi-automated checkpoints may use information from the mobile driver's license and/or other government-issued digital identification to determine whether or not the person is authorized to perform one or more actions. The automated and/or semi-automated checkpoints may then signal one or more associated access mechanisms (such as an automated and/or other gate that may open and/or close to allow and/or deny access, one or more indicator lights and/or other displays that may indicate whether or not access is allowed and/or denied, one or more notification mechanisms that notify security personnel to allow and/or deny access, and so on) to allow and/or deny access. As such, a physical identification token for the person (such as a physical driver's license card, a physical passport, a physical state and/or federal and/or other identification card) may not need to be checked.

However, such a procedure is limited to situations where people have a mobile driver's license and/or other government-issued digital identification stored on a mobile device that is capable of communicating with the automated and/or semi-automated checkpoints. Some people may not have mobile devices, whether at all or with the person at the relevant time. Other people may have mobile devices, but the electronic devices may not be capable of storing a mobile driver's license and/or other government-issued digital identification and/or communicating with an automated and/or semi-automated checkpoint (such as where the battery if the mobile device is dead, the mobile device is broken and/or otherwise impaired, the mobile device lacks storage space for a mobile driver's license and/or other government-issued digital identification, the mobile device is not configured to communicate with an automated and/or semi-automated checkpoint, a communication unit of the mobile device is broken and/or otherwise not configured correctly and/or currently functional, and so on). By way of example, not all states in the United States of America currently issue mobile driver's licenses. Residents of states in the United States of America that do not issue mobile driver's licenses may be incapable of using such a system, and may thus be incapable of benefiting from the advantages of such a system as well as requiring the system to expend resources to provide alternative procedures.

The present disclosure relates to identification systems that maintain digital identities for people and use such digital identities to generate and/or provide one or more digital identification objects to one or more checkpoints. Such digital identification objects may be generated on the fly using identity information stored in association with the digital identities, stored, and so on. The identification system may generate the digital identification object in a format expected by the checkpoint, may have a trusted relationship with the checkpoint and/or may be configured to securely communicate with the checkpoint, and so on. In this way, the identification system may enable use of the automated and/or semi-automated checkpoints discussed above without requiring that people have a mobile driver's license and/or other government-issued digital identification stored on a mobile device that is capable of communicating with the automated and/or semi-automated checkpoints.

This allows performance of functions that were previously not performable and enables more efficiency while expending less work, eliminating unnecessary hardware and/or other components, and more efficiently using hardware, software, network, and/or other resources. This may improve the operation of systems involved by reducing unnecessary components, increasing the speed at which the systems perform operations, and/or reducing consumption of hardware, software, network, and/or other resources. For example, people may use the automated and/or semi-automated checkpoints discussed above without requiring to have a mobile driver's license and/or other government-issued digital identification stored on a mobile device that is capable of communicating with the automated and/or semi-automated checkpoints. As such, the mobile devices may be eliminated, mobile device hardware and/or software components for performing such functions may be eliminated, checkpoint hardware and/or software components for performing such functions may be eliminated, the identification system may maintain a secure communication connection with a checkpoint and/or associated device instead of multiple mobile devices needing to each establish separate secure communication connections with the checkpoint and/or other associated device, and so on.

In various implementations, a system includes at least one non-transitory storage medium that stores instructions and at least one processor. The at least one processor executes the instructions to receive a digital representation of a biometric for a person, determine an identity for the person using the digital representation of the biometric, generate a digital identification object for the person using identity information associated with the identity, and provide the digital identification object to a checkpoint.

In some implementations, a system includes at least one non-transitory storage medium that stores instructions and at least one processor. The at least one processor executes the instructions to receive a digital representation of a biometric for a person; determine an identity for the person using the digital representation of the biometric; determine digital identification object information to be included in digital identification objects according to at least one specification; determine a digital identification object format for the digital identification objects according to the at least one specification; generate a digital identification object for the person using identity information associated with the identity, the digital identification object information, and the digital identification object format; and provide the digital identification object to a checkpoint.

In a number of implementations, a system includes at least one non-transitory storage medium that stores instructions and at least one processor. The at least one processor executes the instructions to determine that a person is located within an area; load a local biometric gallery with biometric information for the person; receive a digital representation of a biometric for the person; determine an identity for the person using the digital representation of the biometric and the local biometric gallery; generate a digital identification object for the person using identity information associated with the identity; and provide the digital identification object to a checkpoint.

These and other embodiments are discussed below with reference to FIGS. 1A-12. However, those skilled in the art will readily appreciate that the detailed description given herein with respect to these Figures is for explanatory purposes only and should not be construed as limiting.

FIG. 1A depicts a first example system 100 for providing a digital identification generated for a checkpoint validation based on a biometric identification. The system may include one or more identification system backend devices 101, one or more identification system stations 102, identification system agent devices 105, one or more checkpoints 110, one or more checkpoint backends 114, one or more external system devices 115, one or more mobile devices 108A, 108B, and so on.

The system 100 may include a number of security lanes 109A, 109B located at a first location or area 117. For example, the first location or area 117 may be a security screening location at an airport or similar location. The checkpoint 110 may control access through the security lanes 109A, 109B, such as via an access mechanism 111 (such as an automated and/or other gate that may open and/or close to allow and/or deny access, one or more indicator lights and/or other displays that may indicate whether or not access is allowed and/or denied, one or more notification mechanisms that notify security personnel to allow and/or deny access, and so on).

The checkpoint 110 (which may be a Credential Authentication Technology (CAT) terminal, a Credential Authentication Technology plus Camera (CAT-C) system, an Auto-CAT e-gate CAT-C system, and so on) may be automated and/or semi-automated. The checkpoint 110 may be capable of securely and/or otherwise communicating with mobile devices 108A, 108B (such as one or more smart phones, tablet computing devices, smart watches, laptop computing devices, and so on) associated with one or more people 107A, 107B moving through the security lane 109B (such as when one or more of the people 107A, 107B "taps" their mobile device to a NFC reader 112 and/or similar device). This communication may allow the checkpoint 110 to obtain a mobile driver's license and/or other government-issued digital identification for the people 107A, 107B stored by the mobile devices 108A, 108B. The checkpoint 110 may use information from the mobile driver's license and/or other government-issued digital identification to determine whether or not the people 107A, 107B are authorized to perform one or more actions. The checkpoint 110 may then signal the access mechanism 111 to allow and/or deny access. In some cases, the checkpoint 110 may also use a biometric reader 113 to compare one or more digital representations of one or more biometrics for the people 107A, 107B to biometric data included in the mobile driver's license and/or other government-issued digital identification; compare one or more digital representations of one or more biometrics (such as a digital representation of a fingerprint, a blood vessel scan, a palm-vein scan, a palm scan, a voiceprint, a facial image, a retina image, an iris image, a deoxyribonucleic acid sequence, a heart rhythm, a gait, and so on) for the people 107A, 107B obtained using one or more biometric readers 113 (such as a fingerprint scanner, a blood vessel scanner, a palm-vein scanner, a palm scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on) to stored biometric data; use information from the mobile driver's license and/or other government-issued digital identification to determine authorization information for the person (such as using the person's name, biometric information, and/or other information to determine whether or not the person has a valid boarding pass and/or ticket and/or other authorization indication by communicating with an airline database, secure flight database, and/or other data source maintained by the external system device 115; and so on. As such, a physical identification token for the people 107A, 107B may not need to be checked.

However, this may be limited to situations where the people 107A, 107B have a mobile driver's license and/or other government-issued digital identification stored on the mobile devices 108A, 108B, that the mobile devices 108A, 108B are capable of communicating with the automated and/or semi-automated checkpoints, and/or that the people 107A, 107B take the mobile devices 108A, 108B out of a pocket, purse, bag, and/or other location. Instead, the system 100 may use one or more of the identification system backend device 101, the identification system station 102, the identification system agent device 105, an agent 106, the external system device 115, and so on to control access to the checkpoint 110 via the security lane 109A (such as via an access mechanism 104, such as an automated and/or other gate that may open and/or close to allow and/or deny access, one or more indicator lights and/or other displays that may indicate whether or not access is allowed and/or denied, one or more notification mechanisms that notify security personnel to allow and/or deny access, and so on) without requiring that the people 107A, 107B have a mobile driver's license and/or other government-issued digital identification stored on the mobile devices 108A, 108B, that the mobile devices 108A, 108B are capable of communicating with the automated and/or semi-automated checkpoints, and/or that the people 107A, 107B take the mobile devices 108A, 108B out of a pocket, purse, bag, and/or other location.

To accomplish this, the system 100 may maintain digital identities for the people 107A, 107B and/or other people (which may be the result of enrollment of the people in a biometric identification system and/or other identification system, an example of which is discussed below with respect to FIG. 3) and use such digital identities to generate and/or provide one or more digital identification objects directly and/or indirectly to the checkpoint 110. Such digital identification objects may be generated on the fly using identity information stored in association with the digital identities, stored, and so on. The system 100 may generate the digital identification object in a format expected by the checkpoint 110, may have a trusted relationship with the checkpoint 110 and/or may be configured to securely communicate with the checkpoint 110, and so on. In this way, the system 100 may enable use of the checkpoint 110 without requiring that the people 107A, 107B have a mobile driver's license and/or other government-issued digital identification stored on the mobile device 108A, 108B and/or that the mobile device 108A, 108B is capable of communicating with the checkpoint 110.

This allows performance of functions that were previously not performable and enables more efficiency while expending less work, eliminating unnecessary hardware and/or other components, and more efficiently using hardware, software, network, and/or other resources. This may improve the operation of systems involved by reducing unnecessary components, increasing the speed at which the systems perform operations, and/or reducing consumption of hardware, software, network, and/or other resources. For example, people may use the automated and/or semi-automated checkpoints discussed above without requiring having a mobile driver's license and/or other government-issued digital identification stored on a mobile device that is capable of communicating with the automated and/or semi-automated checkpoints. As such, the mobile devices may be eliminated, mobile device hardware and/or software components for performing such functions may be eliminated, checkpoint hardware and/or software components for performing such functions may be eliminated, the identification system may maintain a secure communication connection with a checkpoint and/or associated device instead of multiple mobile devices needing to each establish separate secure communication connections with the checkpoint and/or other associated device, and so on.

For example, the system 100 may receive a digital representation of a biometric for a person 107A, 107B to determine an identity for the person 107A, 107B using the digital representation of the biometric, generate a digital identification object for the person 107A, 107B using identity information associated with the identity, and provide the digital identification object to the checkpoint 110.

By way of illustration, the identification system station 102 may use one or more biometric readers 103 (such as a fingerprint scanner, a blood vessel scanner, a palm-vein scanner, a palm scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on) to obtain one or more digital representations of one or more biometrics (such as one or more fingerprints, blood vessel scans, palm-vein scans, voiceprints, facial images, retina images, iris images, deoxyribonucleic acid sequences, heart rhythms, gaits, and so on) for one or more of the people 107A, 107B and transmit such to the identification system backend device 101. For example, the biometric reader 103 may be a camera and/or other image sensor that captures facial, retina, iris, and/or other images of the people 107A, 107B as they are in motion moving through the security lane 109A. The identification system backend device 101 may determine a digital identity for which identity information is stored that is associated with the digital representation of the biometric by comparing the digital representation of the biometric to stored biometric data associated with the digital identity. The identification system backend device 101 may generate a digital identification object for the person 107A, 107B using the identity information associated with the identity, and provide the digital identification object to the identification system agent device 105 along with an image of the person 107A, 107B (and/or multiple other people if the identification identified multiple possible people and/or if the system 100 tests the identification by requiring the agent 106 to pick the person 107A, 107B out of a group of people indicated on the identification system agent device 105) and/or other biometric data. The identification system agent device 105 may provide the image and/or other biometric data to the agent 106, who may compare the person 107A, 107B to the image and/or other biometric data. The agent 106 may indicate confirmation (i.e., an indication of the identity of the person 107A, 107B) to the identification system agent device 105 if there is a match, which may then be transmitted to the identification system station 102. Upon receipt of the confirmation, the identification system station 102 may operate the access mechanism 104 to allow the agent 106 and the person 107A, 107B to pass, whereupon the agent 106 may tap the identification system agent device 105 to the NFC reader 112 to provide the digital identification object for the person 107A, 107B to the checkpoint 110. The checkpoint 110 may then evaluate the authorization of the person 107A, 107B accordingly.

Although the above describes the system 100 performing actions related to generating digital identification objects for both of the people 107A, 107B, it is understood that this is an example. In some implementations, the system 100 may maintain a digital identity for one but not both of the people 107A, 107B and access through the security lane 109A may be limited to people 107A, 107B for whom the system 100 maintains digital identities. Various configurations are possible and contemplated without departing from the scope of the present disclosure.

Further, although the above describes particular components of the system 100 performing particular functions and communicating with particular other components, it is understood that this is an example. In other implementations, other components may perform these functions and/or communicate with other components without departing from the scope of the present disclosure.

By way of illustration, in some examples, the identification system agent device 105 and/or the identification system station 102 may perform functions attributed above to the identification system backend device 101 without departing from the scope of the present disclosure.

By way of another illustration, in various examples, the identification system backend device 101 and/or the identification system station 102 may communicate with the checkpoint 110 and/or the checkpoint backend 114 (such as to provide the digital identification object) without departing from the scope of the present disclosure.

By way of still another illustration, in a number of examples, the identification system agent device 105 and/or one or more of the mobile devices 108A, 108B may communicate with the checkpoint 110 via another mechanism than the NFC reader 112, such as Bluetooth®, WiFi, and so on.

By way of yet another illustration, in some examples, one or more of the identification system backend device 101, identification system station 102, identification system agent device 105, checkpoint 110, checkpoint backend 114, external system device 115, mobile devices 108A, 108B, agent 106, and so on may be omitted and/or the functions attributed to such performed by another component of the system 100 without departing from the scope of the present disclosure. For example, in some implementations, the checkpoint backend 114 may be omitted without departing from the scope of the present disclosure. Alternatively and/or additionally, in various implementations, the agent 106, the identification system backend device 101, the identification station 102, the access mechanism 104, the identification system agent device 105, and/or the biometric reader 103 may be omitted and the functions attributed to such may instead be performed by one or more of the agent 106, the identification system backend device 101, the identification station 102, the access mechanism 104, the identification system agent device 105, and/or the biometric reader 103 without departing from the scope of the present disclosure.

Additionally, although the above describes the system 100 as providing the digital identification object to the checkpoint 110, it is understood that this is an example. In some implementations, the system 100 may provide the digital identification object to the mobile device 108A, 108B, which may store such in one or more "digital wallets" and/or similar structures and/or provide such to the checkpoint 110. In other implementations, the system 100 may provide the digital identification object to the checkpoint backend 114, which may then provide the digital identification object to the checkpoint 110. Various configurations are possible and contemplated without departing from the scope of the present disclosure.

The system 100 may use at least one specification for determining digital identification object information to include in the digital identification object (such as one or more first names, middle names, last names, initials, addresses, state of residence, country of residence, city of residence, occupation, telephone numbers, social security numbers and/or other identification numbers, facial images and/or other images of at least a portion of the person and/or other biometric data, date of birth, month of birth, day of birth, year of birth, digital identification object generation date, digital identification object expiration date, height, eye color, hair color, gender, digital identification object classification, and so on) and/or digital identification object format to use for the digital identification object. The digital identification object format may specify a sequence of packets and/or other data structures that are to be used to construct the digital identification object, a structure of where particular digital identification object information is stored in the packets and/or other data structures, identifiers and/or other metadata to include in the packets and/or other data structures that may indicate where particular digital identification object information is stored, and so on. The digital identification object format may correspond to at least one of a mobile driver's license format, a mobile state identification format, a mobile federal identification format, a mobile governmental identification format, or a mobile passport format. The at least one specification may be one that is required by and/or associated with the checkpoint 110. The at least one specification may be obtained from the checkpoint 110, obtained from the checkpoint backend 114, stored and/or accessible by the identification system backend device 101, stored and/or accessible by the identification system station 102, stored and/or accessible by the identification system agent device 105, and so on.

For example, the system 100 may receive a digital representation of a biometric for a person; determine an identity for the person 107A, 107B using the digital representation of the biometric; determine digital identification object information to be included in digital identification objects according to at least one specification; determine a digital identification object format for the digital identification objects according to the at least one specification; generate a digital identification object for the person 107A, 107B using identity information associated with the identity, the digital identification object information, and the digital identification object format; and provide the digital identification object to the checkpoint 110.

The system 100 may perform gallery management of one or more biometric galleries that are used for biometric identification and/or other biometric comparison. For example, the system 100 may maintain a main biometric gallery that includes all of the biometric data used by the identification system. Rather than performing all biometric identification and/or other comparisons against all of the main biometric gallery, the system 100 may generate one or more local biometric galleries than include a subset (i.e., some but not all such that the local biometric gallery may be smaller than the main biometric gallery) of the biometric data of the main biometric gallery and use such for biometric identification and/or other comparisons. This may result in faster biometric identification and/or other comparisons (due to less data being compared, speed of data access, and so on), more accurate biometric identification and/or other comparisons (such as where biometric identification and/or other comparisons like facial comparisons are less accurate when the gallery includes more than a threshold amount of biometric data, such as more than 10,000 facial images), and so on. In some implementations, the local biometric gallery may be stored at the first location or area 117 and/or another location to the device using the local biometric gallery than the main biometric gallery. This may improve access speed to the local biometric gallery as compared to the main biometric gallery.

In various examples, biometric data may be included in the local biometric gallery when the system 100 determines that the biometric data is likely to be accessed, such as where the people 107A, 107B associated with the biometric data have access permissions (such as flight and/or other tickets) associated with the first location or area 117 for a particular time, where the people 107A, 107B (and/or the mobile devices 108A, 108B) have been detected in the first location or area 117, and so on. By way of illustration, the system 100 may use geofencing, wireless communication network beacons, receipt of one or more wireless communication identifiers (such as a network address, network name, or network other structure that uniquely identifies an electronic device (such as the mobile device 108A, 108B) or communication component thereof in wireless communication) associated with the mobile devices 108A, 108B at and/or proximate to the first location or area 117, check ins and/or other app activity, and/or other techniques to determine that the mobile devices 108A, 108B are within and/or proximate to the first location or area 117, that the people 107A, 107B are associated with the mobile devices 108A, 108B, and add biometric data for the people 107A, 107B from the main biometric gallery to the local biometric gallery.

By way of illustration, the system 100 may determine that a person 107A, 107B is located within the first location or area 117; load a local biometric gallery with biometric information for the person 107A, 107B; receive a digital representation of a biometric for the person 107A, 107B; determine an identity for the person 107A, 107B using the digital representation of the biometric and the local biometric gallery; generate a digital identification object for the person 107A, 107B using identity information associated with the identity; and provide the digital identification object to the checkpoint 110.

Although the above describes the system 100 obtaining digital representations of biometrics and performing identifications based thereon, it is understood that this is an example. In some implementations, the mobile devices 108A, 108B may run an app associated with an identification system that is associated with the system 100. Such an app may perform biometric identifications (such as using the biometric data stored by the system and/or biometric data stored by the mobile devices 108A, 108B). These biometric identifications may be performed as part of various activities, such as calculating estimated travel times (such as from a home to an airport gate), checking in for travel, making purchases, accessing health data, requesting access, and so on. As such, the app may also maintain the digital identities and/or cooperate with the system to maintain the digital identities. In such an implementation, the system 100 may determine (such as by communicating with the mobile devices 108A, 108B) whether or not the app has performed a biometric identification within a threshold period of time (such as five minutes, an hour, and so on). If so, the system 100 may use identity information associated with the biometric identification to generate the digital identification object without re-performing biometric identification. Various configurations are possible and contemplated without departing from the scope of the present disclosure.

The checkpoint backend 114 may be located at a second location or area 116A, the external system device 115 may be located at a third location or area 116B, and the identification system backend device 101 may be located at a fourth location or area 116C, all of which may be different than the first location or area 117. However, it is understood that this is example. In various implementations, one or more of the identification system backend device 101, the checkpoint backend 114, and/or the external system device 115 may instead be located at the first location or area 117, the second location or area 116A, the third location or area 116B, and/or the fourth location or area 116C without departing from the scope of the present disclosure.

Figure 1B:
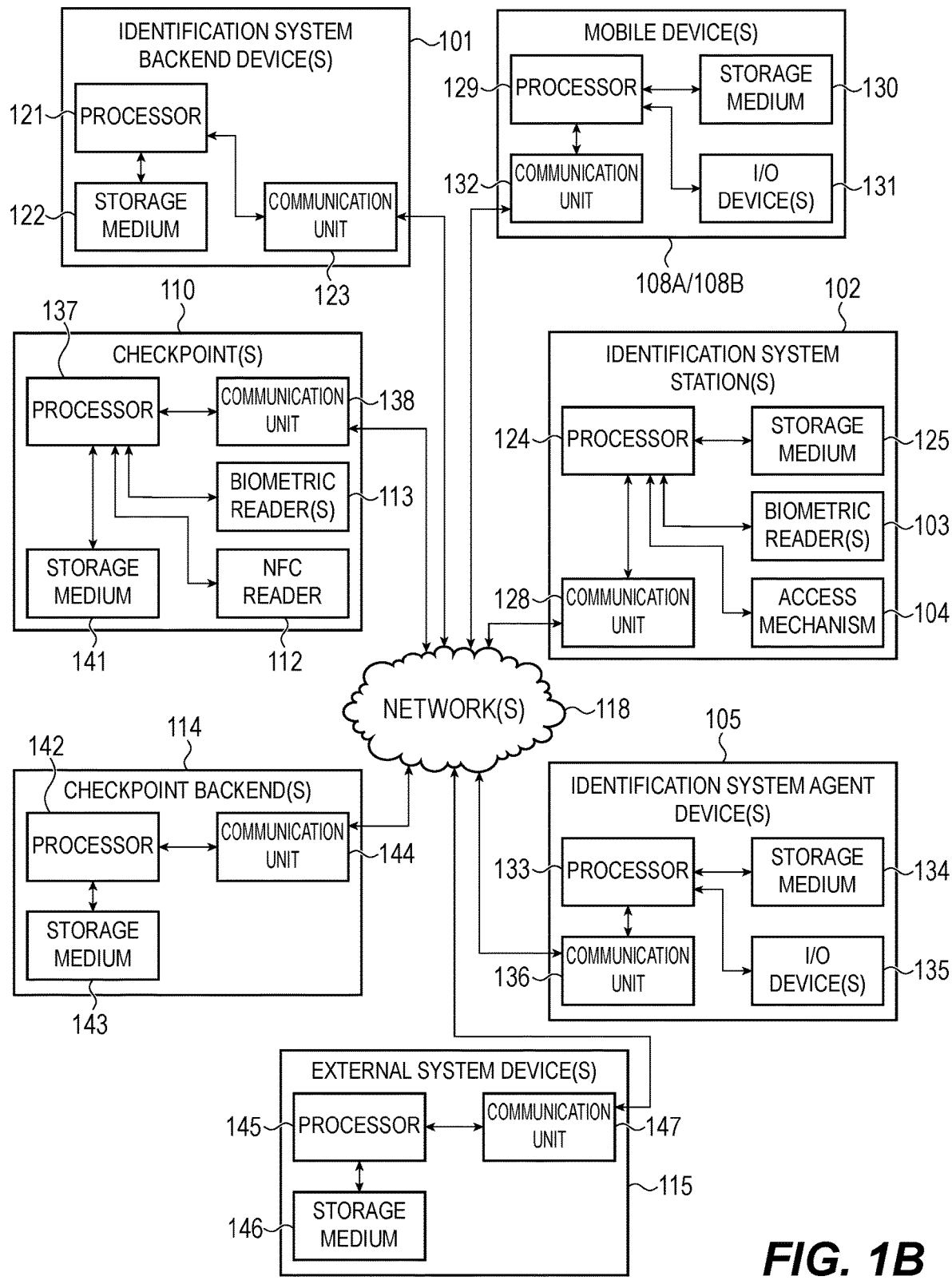
FIG. 1B depicts relationships among example components that may be used to implement the system of FIG. 1A.

FIG. 1B depicts relationships among example components that may be used to implement the system 100 of FIG. 1A.

The identification system backend device 101 may store identity information (such as one or more names, addresses, telephone numbers, social security numbers, patient identification numbers or other identifiers, insurance data, financial data, health information (such as one or more temperatures, pupil dilation, medical diagnoses, immunocompromised conditions, medical histories, medical records, infection statuses, vaccinations, immunology data, results of antibody tests evidencing that a person has had a particular communicable illness and recovered, blood test results, saliva test results, and/or the like), and so on) associated with the identities of people (which may be verified identities, where the identities are verified as corresponding to the particular person named and/or where the identity information is verified as valid). Alternatively and/or additionally, some or all of the health information may be stored separately from the identity information but otherwise associated with the identity information, such as in a Health Insurance Portability and Accountability Act ("HIPAA") compliant or other data store or enclave. Such a data store or enclave may be stored on one or more different storage media than the identity information, or may be stored on the same storage medium or media and logically isolated from the identity information. The health information may be simultaneously and/or substantially simultaneously accessible as the identity information, such as where the identity information includes a health information identifier or key that may be used to access the separately stored health information. The identification system backend device 101 may control access to the identity information and/or the health information using identity information that is associated with the identity information. The identity information may include biometric data (which may include one or more digital representations of one or more fingerprints, blood vessel scans, palm-vein scans, voiceprints, facial images, retina images, iris images, deoxyribonucleic acid sequences, heart rhythms, gaits, and so on), one or more logins and/or passwords, authorization tokens, social media and/or other accounts, and so on. In various implementations, the identification system backend device 101 may allow the person associated with an identity to control access to the identity information, the health information, and/or other information (such as payment account information, health information (such as medical records, HIPAA protected information in order to be compliant with various legal restrictions, and so on), contact information, and so on. The identification system backend device 101 may control access to such information according to input received from the person.

The identification system backend device 101 may be any kind of electronic device and/or cloud and/or other computing arrangement. Examples of such devices include, but are not limited to, one or more desktop computing devices, laptop computing devices, mobile computing devices, wearable devices, tablet computing devices, mobile telephones, kiosks and/or other stations, smart phones, printers, displays, vehicles, kitchen appliances, entertainment system devices, digital media players, and so on. The identification system backend device 101 may include one or more processors 121 and/or other processing units or controllers, communication units 123, non-transitory storage media 122, and/or other components. The processor 121 may execute one or more sets of instructions stored in the non-transitory storage media 122 to perform various functions, such as receiving and/or storing biometric data and/or other identity information, receiving and/or storing identity information and/or health information, matching one or more received digital representations of biometrics and/or other identity information to stored data, retrieving identity information and/or health information associated with stored data matching one or more received digital representations of biometrics and/or other identity information, providing retrieved identity information and/or health information, communicating with one or more other components of the system 100 (whether directly and/or via one or more wired and/or wireless/secured and/or unsecured networks 118 using the communication unit 123, generating one or more digital identification objects, providing one or more digital identification objects, performing gallery management, and so on. Alternatively and/or additionally, the identification system backend device 101 may involve one or more memory allocations configured to store at least one executable asset and one or more processor allocations configured to access the one or more memory allocations and execute the at least one executable asset to instantiate one or more processes and/or services, such as one or more gallery management services, biometric identifications services, digital identification object generation and/or providing services, and so on.

Similarly, the identification system station 102 may be any kind of electronic device and/or cloud and/or other computing arrangement. Examples of such devices include, but are not limited to, one or more desktop computing devices, laptop computing devices, mobile computing devices, wearable devices, tablet computing devices, mobile telephones, kiosks and/or other stations, smart phones, printers, displays, vehicles, kitchen appliances, entertainment system devices, digital media players, and so on. The identification system station 102 may include one or more processors 124 and/or other processing units or controllers, communication units 128, non-transitory storage media 125, biometric readers 103, access mechanisms 104, and/or other components. The processor 124 may execute one or more sets of instructions stored in the non-transitory storage media 125 to perform various functions, such as receiving and/or storing biometric data and/or other identity information, receiving and/or storing identity information and/or health information, matching one or more received digital representations of biometrics and/or other identity information to stored data, retrieving identity information and/or health information associated with stored data matching one or more received digital representations of biometrics and/or other identity information, providing retrieved identity information and/or health information, communicating with one or more other components of the system 100 (whether directly and/or via one or more wired and/or wireless/secured and/or unsecured networks 118 using the communication unit 128, controlling the access mechanism 104, generating one or more digital identification objects, providing one or more digital identification objects, performing gallery management, and so on. Alternatively and/or additionally, the identification system station 102 may involve one or more memory allocations configured to store at least one executable asset and one or more processor allocations configured to access the one or more memory allocations and execute the at least one executable asset to instantiate one or more processes and/or services, such as one or more gallery management services, biometric identifications services, digital identification object generation and/or providing services, and so on.

Likewise, the identification system agent device 105 may be any kind of electronic device and/or cloud and/or other computing arrangement. Examples of such devices include, but are not limited to, one or more desktop computing devices, laptop computing devices, mobile computing devices, wearable devices, tablet computing devices, mobile telephones, kiosks and/or other stations, smart phones, printers, displays, vehicles, kitchen appliances, entertainment system devices, digital media players, and so on. The identification system agent device 105 may include one or more processors 133 and/or other processing units or controllers, communication units 136, non-transitory storage media 134, input and/or output devices 135 (such as one or more displays, printers, speakers, microphones, keyboards, touch screens, mice, and so on), and/or other components. The processor 133 may execute one or more sets of instructions stored in the non-transitory storage media 134 to perform various functions, such as receiving and/or storing biometric data and/or other identity information, receiving and/or storing identity information and/or health information, matching one or more received digital representations of biometrics and/or other identity information to stored data, retrieving identity information and/or health information associated with stored data matching one or more received digital representations of biometrics and/or other identity information, providing retrieved identity information and/or health information, communicating with one or more other components of the system 100 (whether directly and/or via one or more wired and/or wireless/secured and/or unsecured networks 118 using the communication unit 136, controlling the access mechanism 104, generating one or more digital identification objects, providing one or more digital identification objects, performing gallery management, and so on. Alternatively and/or additionally, the identification system agent device 105 may involve one or more memory allocations configured to store at least one executable asset and one or more processor allocations configured to access the one or more memory allocations and execute the at least one executable asset to instantiate one or more processes and/or services, such as one or more gallery management services, biometric identifications services, digital identification object generation and/or providing services, and so on.

Similarly, the checkpoint 110 may be any kind of electronic device and/or cloud and/or other computing arrangement. Examples of such devices include, but are not limited to, one or more desktop computing devices, laptop computing devices, mobile computing devices, wearable devices, tablet computing devices, mobile telephones, kiosks and/or other stations, smart phones, printers, displays, vehicles, kitchen appliances, entertainment system devices, digital media players, and so on. The checkpoint 110 may include one or more processors 137 and/or other processing units or controllers, communication units 138, biometric readers 113, non-transitory storage media 141, NFC readers 112, and/or other components. The processor 137 may execute one or more sets of instructions stored in the non-transitory storage media 141 to perform various checkpoint 110 functions. Alternatively and/or additionally, the checkpoint 110 may involve one or more memory allocations configured to store at least one executable asset and one or more processor allocations configured to access the one or more memory allocations and execute the at least one executable asset to instantiate one or more processes and/or services.

Likewise, the checkpoint backend 114 may be any kind of electronic device and/or cloud and/or other computing arrangement. Examples of such devices include, but are not limited to, one or more desktop computing devices, laptop computing devices, mobile computing devices, wearable devices, tablet computing devices, mobile telephones, kiosks and/or other stations, smart phones, printers, displays, vehicles, kitchen appliances, entertainment system devices, digital media players, and so on. The checkpoint backend 114 may include one or more processors 142 and/or other processing units or controllers, communication units 144, non-transitory storage media 143, and/or other components. The processor 142 may execute one or more sets of instructions stored in the non-transitory storage media 143 to perform various checkpoint backend 114 functions. Alternatively and/or additionally, the checkpoint backend 114 may involve one or more memory allocations configured to store at least one executable asset and one or more processor allocations configured to access the one or more memory allocations and execute the at least one executable asset to instantiate one or more processes and/or services.

Likewise, the external system device 115 may include one or more processors 145 and/or other processing units or controllers, communication units 147, non-transitory storage media 146, and/or other components. The processor 145 may execute one or more sets of instructions stored in the non-transitory storage media 146 to perform various external system device 115 functions.

Similarly, the mobile devices 108A, 108B may include one or more processors 129 and/or other processing units or controllers, communication units 132, non-transitory storage media 130, input and/or output devices 131, and/or other components. The processor 129 may execute one or more sets of instructions stored in the non-transitory storage media 130 to perform various mobile device 108A, 108B functions.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Example information can include, but may not be limited to: personal identity information (e.g., names, social security numbers, telephone numbers, email addresses, physical addresses, driver's license information, passport numbers, and so on); identity documents (e.g., driver's licenses, passports, government identification cards or credentials, and so on); protected health information (e.g., medical records, dental records, and so on); financial, banking, credit, or debt information; third-party service account information (e.g., usernames, passwords, social media handles, and so on); encrypted or unencrypted files; database files;

network connection logs; shell history; filesystem files; libraries, frameworks, and binaries; registry entries; settings files; executing processes; hardware vendors, versions, and/or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Although FIG. 1B depicts relationships among example components that may be used to implement the system 100 of FIG. 1A, it is understood that these are examples. In other implementations, other arrangements of the same, similar, and/or different components may be used to implement the system 100 of FIG. 1A. Various configurations are possible and contemplated without departing from the scope of the present disclosure.

Figure 2:
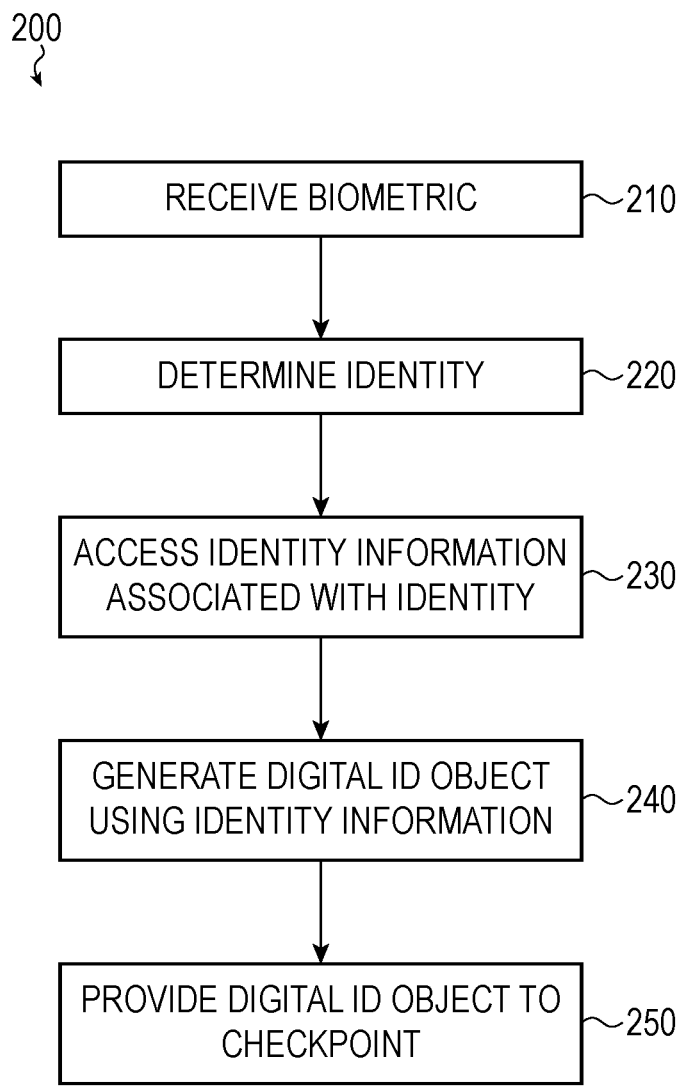
FIG. 2 is a flow chart illustrating a first example method for providing a digital identification generated for a checkpoint validation based on a biometric identification. The method may be performed by the system of FIG. 1A and/or FIG. 1B.

FIG. 2 is a flow chart illustrating a first example method 200 for providing a digital identification generated for a checkpoint validation based on a biometric identification. The method 200 may be performed by the system 100 of FIG. 1A and/or FIG. 1B.

At operation 210, an electronic device (such as the identification system backend device 101 of FIGS. 1A and/or 1B, the identification system station 102 of FIGS. 1A and/or 1B, the identification system agent device 105 of FIGS. 1A and/or 1B, and so on) may receive one or more digital representation of one or more biometrics. For example, the digital representation of the biometric may include a digital representation of a fingerprint, a blood vessel scan, a palm-vein scan, a palm scan, a voiceprint, a facial image, a retina image, an iris image, a deoxyribonucleic acid sequence, a heart rhythm, a gait, and so on At operation 220, the electronic device may determine an identity. The electronic device may determine the identity by comparing the digital representation of the biometric to stored biometric data associated with one or more identities, requesting that another device do so, and so on.

At operation 230, the electronic device may access identity information associated with the identity. The identity information may include one or more names, addresses, telephone numbers, social security numbers, patient identification numbers or other identifiers, insurance data, financial data, health information (such as one or more temperatures, pupil dilation, medical diagnoses, immunocompromised conditions, medical histories, medical records, infection statuses, vaccinations, immunology data, results of antibody tests evidencing that a person has had a particular communicable illness and recovered, blood test results, saliva test results, and/or the like), and so on.

At operation 240, the electronic device may generate a digital identification object using at least some of the identity information. For example, the electronic device may generate the digital identification object by including in the digital identification object one or more first names, middle names, last names, initials, addresses, state of residence, country of residence, city of residence, occupation, telephone numbers, social security numbers and/or other identification numbers, facial images and/or other images of at least a portion of the person and/or other biometric data, date of birth, month of birth, day of birth, year of birth, digital identification object generation date, digital identification object expiration date, height, eye color, hair color, gender, digital identification object classification, and so on.

At operation 250, the electronic device may provide the digital identification object to a checkpoint. The electronic device may provide the digital identification object directly to the checkpoint, such as via a NFC reader tap, via one or more networks, and so on. Alternatively, the electronic device may provide the digital identification object indirectly via one or more other devices, such as via one or more checkpoint backends.

In various examples, this example method 200 may be implemented using a group of interrelated software modules or components that perform various functions discussed herein. These software modules or components may be executed within a cloud network and/or by one or more computing devices, such as the identification system backend device 101 of FIGS. 1A and/or 1B, the identification system station 102 of FIGS. 1A and/or 1B, the identification system agent device 105 of FIGS. 1A and/or 1B, and so on.

Although the example method 200 is illustrated and described as including particular operations performed in a particular order, it is understood that this is an example. In various implementations, various orders of the same, similar, and/or different operations may be performed without departing from the scope of the present disclosure.

For example, the method is illustrated and described as receiving one or more digital representations of one or more biometrics. However, it is understood that this is an example. In some implementations, the electronic device may communicate with an app executing on a mobile device to determine whether or not the app has performed a biometric identification associated within a threshold period of time (such as five minutes, an hour, and so on). If so, the electronic device may identify the person associated with the mobile device as the identity associated with the biometric identification. Various configurations are possible and contemplated without departing from the scope of the present disclosure.

Figure 3:
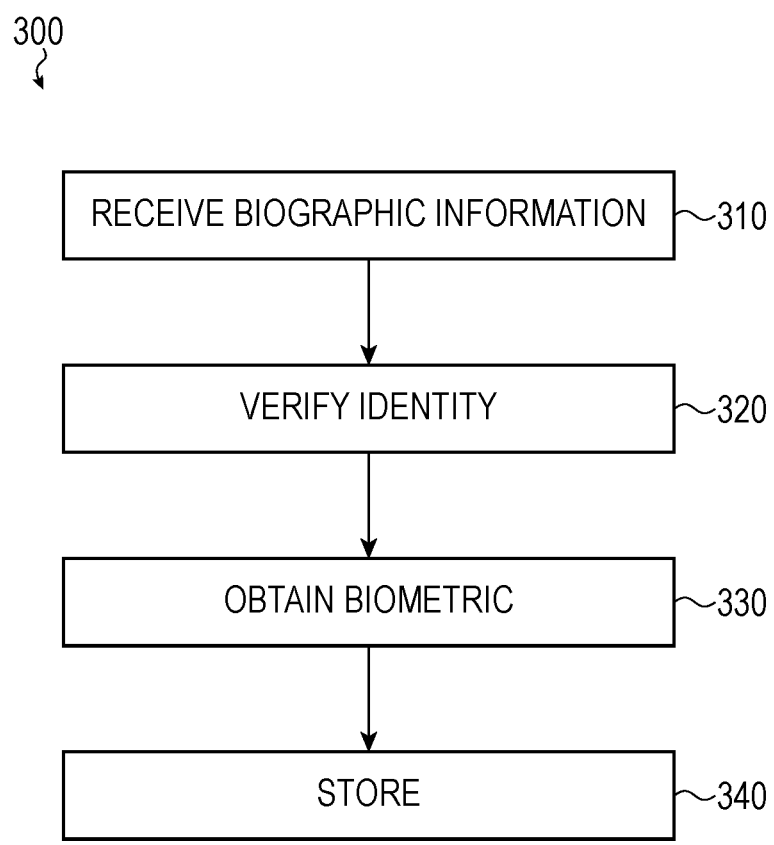
FIG. 3 is a flow chart illustrating an example method for enrolling a person in an identification system. The method may be performed by the system of FIG. 1A and/or FIG. 1B.

FIG. 3 is a flow chart illustrating an example method 300 for enrolling a person in an identification system. The method 300 may be performed by the system 100 of FIG. 1A and/or FIG. 1B.

At operation 310, an electronic device (such as the identification system backend device 101 of FIGS. 1A and/or 1B, the identification system station 102 of FIGS. 1A and/or 1B, the identification system agent device 105 of FIGS. 1A and/or 1B, and so on) may receive biographic information for one or more people. This biographic information may include one or more names, addresses, phone numbers, social security numbers and/or other identification numbers, images of one or more physical identification cards (such as one or more driver's licenses, state and/or federal and/or other governmental and/or other identification cards, passports, and so on) and/or information therefrom, and so on.

At operation 320, the electronic device may verify the identity associated with the biographic information. This verification may include verifying that the person is who the person asserts and/or validating that the person is trustworthy enough for enrollment in an identification system. This verification may be performed to one or more different assurance levels dependent upon different assurance level requirements. For example, the biographic information may be used to query one or more databases for additional information about the person. As such, information associated with the identity of the person may be aggregated from several sources, increasing the fidelity of the verification. This additional information may be evaluated to determine whether the person is who the person asserts and/or validate that the person is trustworthy enough for enrollment in an identification system. For example, the additional information may be evaluated to determine that the person is not the subject of outstanding arrest warrants. Additionally, the additional information may be used to generate questions that the person may be required to answer in order to verify that the person is who they assert. If the electronic device verifies the identity associated with the biographic information, the electronic device may generate a digital identity for the person and store such, as well as storing various identity information associated with the digital identity.

At operation 330, the electronic device may obtain one or more digital representations of biometrics for the person. The electronic device may perform one or more liveness checks to verify that the person providing the digital representations of the biometrics is the same person who provided the biographic information.

At operation 340, the electronic device may store the digital representation of the biometric for the person. The electronic device may store the digital representation of the biometric for the person in association with the digital identity, the identity information, and so on.

In various examples, this example method 300 may be implemented using a group of interrelated software modules or components that perform various functions discussed herein. These software modules or components may be executed within a cloud network and/or by one or more computing devices, such as the identification system backend device 101 of FIGS. 1A and/or 1B, the identification system station 102 of FIGS. 1A and/or 1B, the identification system agent device 105 of FIGS. 1A and/or 1B, and so on.

Although the example method 300 is illustrated and described as including particular operations performed in a particular order, it is understood that this is an example. In various implementations, various orders of the same, similar, and/or different operations may be performed without departing from the scope of the present disclosure.

For example, the method is illustrated and described as verifying the identity. However, it is understood that this is an example. In some implementations, the electronic device may perform operations 310 and 330-340 while omitting operation 320. Various configurations are possible and contemplated without departing from the scope of the present disclosure.

Figure 4:
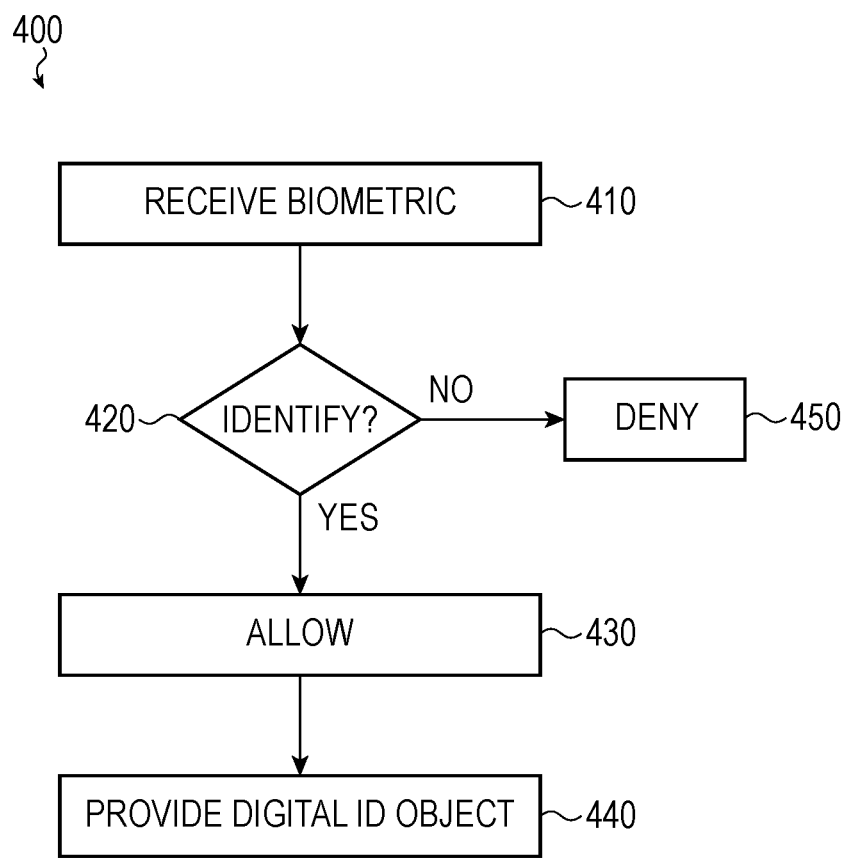
FIG. 4 is a flow chart illustrating a second example method for providing a digital identification generated for a checkpoint validation based on a biometric identification. The method may be performed by the system of FIG. 1A and/or FIG. 1B.

FIG. 4 is a flow chart illustrating a second example method 400 for providing a digital identification generated for a checkpoint validation based on a biometric identification. The method 400 may be performed by the system 100 of FIG. 1A and/or FIG. 1B.

At operation 410, an electronic device (such as the identification system backend device 101 of FIGS. 1A and/or 1B, the identification system station 102 of FIGS. 1A and/or 1B, the identification system agent device 105 of FIGS. 1A and/or 1B, and so on) may receive one or more digital representations of one or more biometrics. For example, the electronic device may receive the digital representation of the biometric, directly and/or indirectly, from a fingerprint scanner, a blood vessel scanner, a palm-vein scanner, a palm scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on.

At operation 420, the electronic device may determine whether or not an identification can be performed using the digital representation of the biometric. If not, the flow may proceed to operation 450 where the electronic device denies access to a checkpoint. Otherwise, if the electronic device determines an identification can be performed using the digital representation of the biometric, the flow may proceed to operation 430 where the electronic device allows access to the checkpoint.

At operation 440, the electronic device provides a digital identification object to the checkpoint. The digital identification object may be generated using identity information associated with an identity identified by the identification.

In various examples, this example method 400 may be implemented using a group of interrelated software modules or components that perform various functions discussed herein. These software modules or components may be executed within a cloud network and/or by one or more computing devices, such as the identification system backend device 101 of FIGS. 1A and/or 1B, the identification system station 102 of FIGS. 1A and/or 1B, the identification system agent device 105 of FIGS. 1A and/or 1B, and so on.

Although the example method 400 is illustrated and described as including particular operations performed in a particular order, it is understood that this is an example. In various implementations, various orders of the same, similar, and/or different operations may be performed without departing from the scope of the present disclosure.

For example, the method is illustrated and described as allowing access to the checkpoint if the identification can be performed and denying access to the checkpoint if the identification cannot be performed. However, it is understood that this is an example. In other implementations, the electronic device may deny access to the checkpoint if the identification cannot be performed and only allow access to the checkpoint if the identification can be performed and identity information accessed as a result of the identification indicates to allow access to the checkpoint. Various configurations are possible and contemplated without departing from the scope of the present disclosure.

Figure 5:
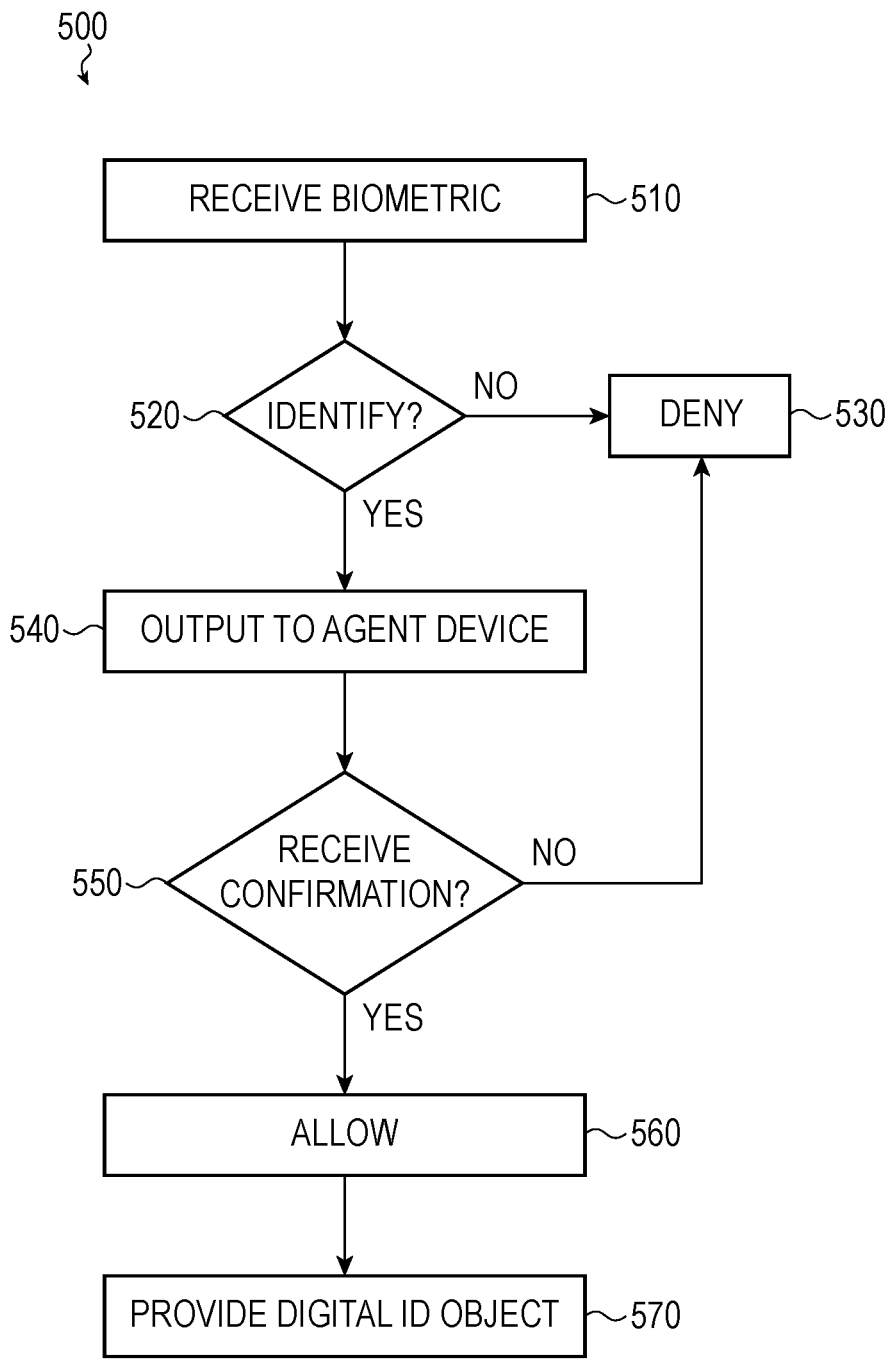
FIG. 5 is a flow chart illustrating a third example method for providing a digital identification generated for a checkpoint validation based on a biometric identification. The method may be performed by the system of FIG. 1A and/or FIG. 1B.

FIG. 5 is a flow chart illustrating a third example method 500 for providing a digital identification generated for a checkpoint validation based on a biometric identification. The method 500 may be performed by the system 100 of FIG. 1A and/or FIG. 1B.

At operation 510, an electronic device (such as the identification system backend device 101 of FIGS. 1A and/or 1B, the identification system station 102 of FIGS. 1A and/or 1B, the identification system agent device 105 of FIGS. 1A and/or 1B, and so on) may receive one or more digital representations of one or more biometrics.

At operation 520, the electronic device may determine whether or not an identification can be performed. If not, the flow may proceed to operation 530 where the electronic device denies access to a checkpoint. Otherwise, if the electronic device determines an identification can be performed, the flow may proceed to operation 540.

At operation 540, the electronic device provides an output to an agent device. In some examples, the output may include at least an image of at least a portion of the person corresponding to an identity identified by the identification and an agent operating the agent device may be prompted to confirm that the person attempting to access the checkpoint is the person in the image. In various examples, the output may include an image of at least a portion of the person corresponding to an identity identified by the identification as well as images of at least a portion of other people forming an image lineup and an agent operating the agent device may be prompted to confirm that the person attempting to access the checkpoint is one of the people in the image lineup by selecting the respective image.

The flow may proceed to operation 550, where the electronic device determines whether or not confirmation from the agent device is received. The flow may proceed to operation 530 where the electronic device denies access to a checkpoint. Otherwise, if the electronic device determines an identification can be performed, the flow may proceed to operation 560 where the electronic device allows access to the checkpoint before the flow proceeds to operation 570 and the electronic device provides a digital identification object (which may be generated using identity information associated with an identity identified by the identification) to the checkpoint.

In various examples, this example method 500 may be implemented using a group of interrelated software modules or components that perform various functions discussed herein. These software modules or components may be executed within a cloud network and/or by one or more computing devices, such as the identification system backend device 101 of FIG. 1A and/or 1B, the identification system station 102 of FIGS. 1A and/or 1B, the identification system agent device 105 of FIGS. 1A and/or 1B, and so on.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described such that the operations 560 and 570 are separate, linearly performed operations. However, it is understood that this is an example. In some implementations, operations 560 and 570 may be combined, performed in reverse order, omitted, and so on. Various configurations are possible and contemplated without departing from the scope of the present disclosure.

Figure 6:
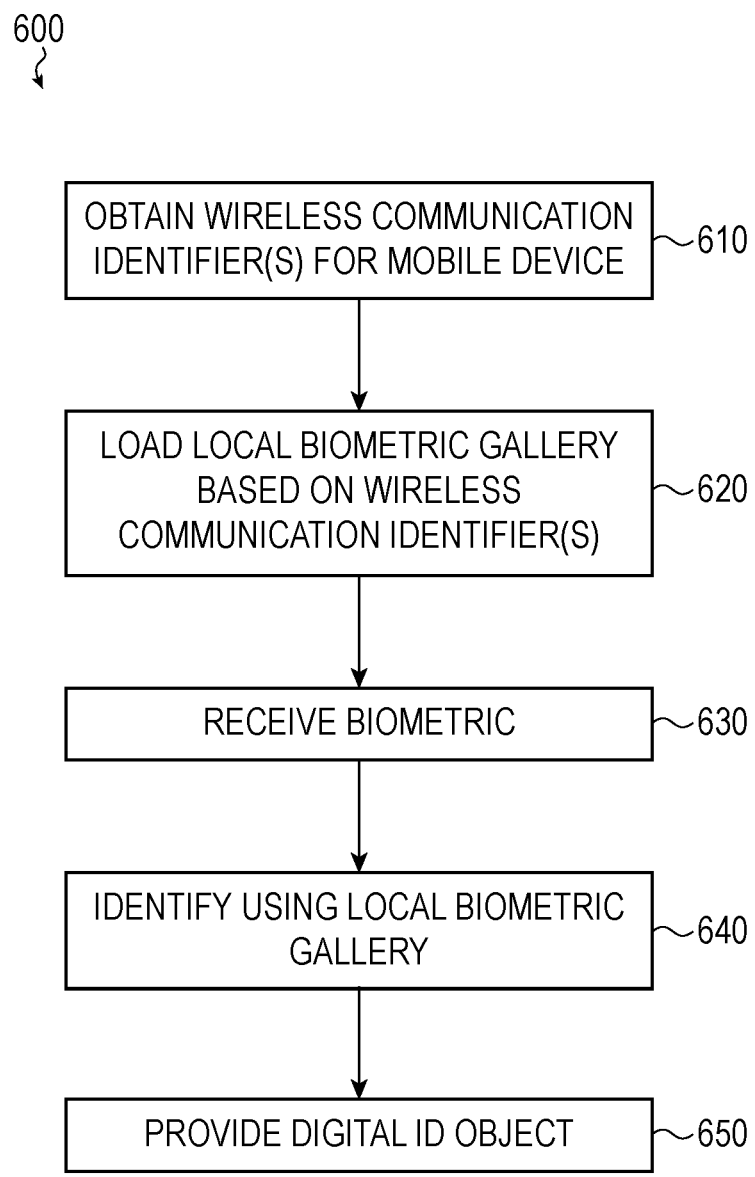
FIG. 6 is a flow chart illustrating a fourth example method for providing a digital identification generated for a checkpoint validation based on a biometric identification. The method may be performed by the system of FIG. 1A and/or FIG. 1B.

FIG. 6 is a flow chart illustrating a fourth example method 600 for providing a digital identification generated for a checkpoint validation based on a biometric identification. The method 600 may be performed by the system 100 of FIG. 1A and/or FIG. 1B.

At operation 610, an electronic device (such as the identification system backend device 101 of FIGS. 1A and/or 1B, the identification system station 102 of FIGS. 1A and/or 1B, the identification system agent device 105 of FIGS. 1A and/or 1B, and so on) may obtain one or more wireless communication identifiers for one or more mobile devices. Such wireless communication identifiers may include a network address, network name, or network other structure that uniquely identifies the mobile device or communication component thereof in wireless communication.

At operation 620, the electronic device may load a local biometric gallery based on the wireless identifiers. The electronic device may load the local biometric gallery from a main biometric gallery, which may be larger than the local biometric gallery, located remote from the local biometric gallery, and so on.

At operation 630, the electronic device may receive one or more digital representations of one or more biometrics. At operation 640, the electronic device may identify a person using the local biometric gallery and the digital representation of the biometric. At operation 650, the electronic device may provide a digital identification object (which may be generated using identity information associated with an identity identified by the identification). The electronic device may provide the digital identification object, directly or indirectly, to a checkpoint.

In various examples, this example method 600 may be implemented using a group of interrelated software modules or components that perform various functions discussed herein. These software modules or components may be executed within a cloud network and/or by one or more computing devices, such as the identification system backend device 101 of FIGS. 1A and/or 1B, the identification system station 102 of FIGS. 1A and/or 1B, the identification system agent device 105 of FIGS. 1A and/or 1B, and so on.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as loading the local biometric gallery based on one or more obtained wireless identifiers. However, it is understood that this is an example. In some implementations, the local biometric gallery may be loaded based on other factors, such as the likelihood that a group of people will be present at a location during a particular time. Various configurations are possible and contemplated without departing from the scope of the present disclosure.

Figure 7:
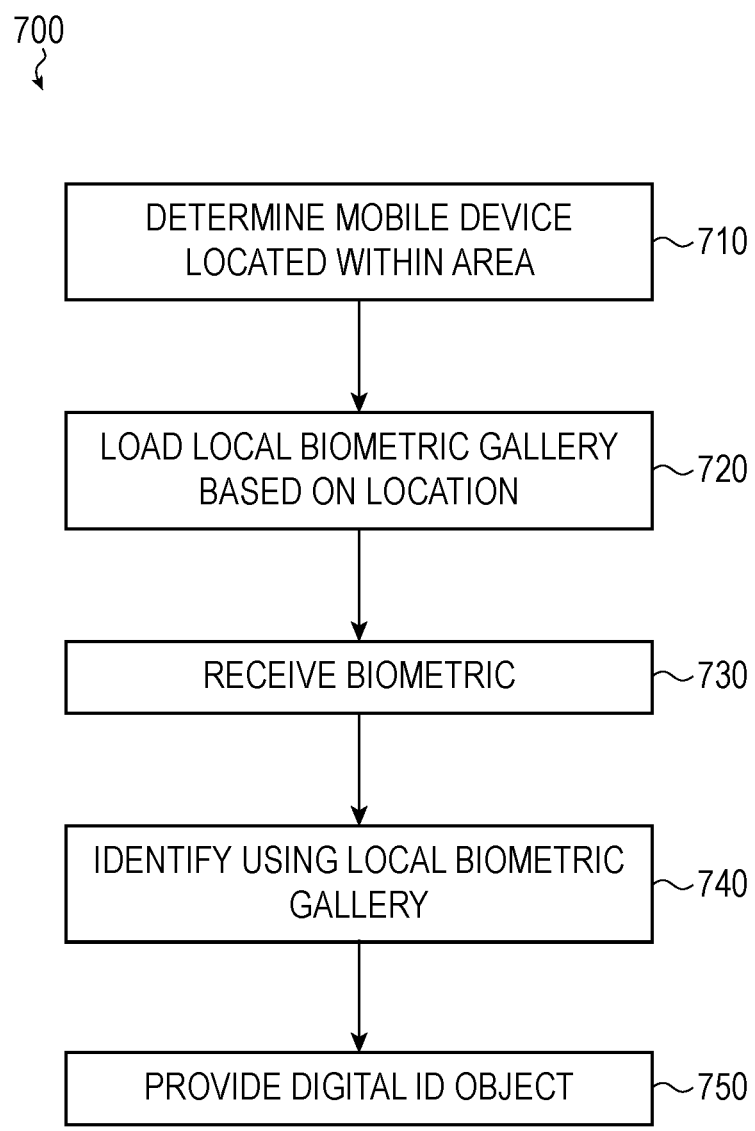
FIG. 7 is a flow chart illustrating a fifth example method for providing a digital identification generated for a checkpoint validation based on a biometric identification. The method may be performed by the system of FIG. 1A and/or FIG. 1B.

FIG. 7 is a flow chart illustrating a fifth example method 700 for providing a digital identification generated for a checkpoint validation based on a biometric identification. The method 700 may be performed by the system 100 of FIG. 1A and/or FIG. 1B.

At operation 710, an electronic device (such as the identification system backend device 101 of FIGS. 1A and/or 1B, the identification system station 102 of FIGS. 1A and/or 1B, the identification system agent device 105 of FIGS. 1A and/or 1B, and so on) may determine that one or more mobile devices are located within an area. The electronic device may determine that the mobile devices are located within the area using geofencing, wireless communication network beacons, and so on. At operation 720, the electronic device may load a local biometric gallery based on the location in which the mobile devices are determined to be located, such as by loading biometric data for identities associated with the mobile devices determined to be located in the location.

At operation 730, the electronic device may receive one or more digital representations of one or more biometrics. At operation 740, the electronic device may identify a person using the local biometric gallery and the digital representation of the biometric. At operation 750, the electronic device may provide a digital identification object (which may be generated using identity information associated with an identity identified by the identification). The electronic device may provide the digital identification object, directly or indirectly, to a checkpoint.

In various examples, this example method 700 may be implemented using a group of interrelated software modules or components that perform various functions discussed herein. These software modules or components may be executed within a cloud network and/or by one or more computing devices, such as the identification system backend device 101 of FIGS. 1A and/or 1B, the identification system station 102 of FIGS. 1A and/or 1B, the identification system agent device 105 of FIGS. 1A and/or 1B, and so on.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as loading the local biometric gallery based on the location in which the mobile devices are determined to be located. However, it is understood that this is an example. In some implementations, the local biometric gallery may be loaded based on other factors, such as check ins for flights or other reservations using one or more apps, use of one or more navigation apps, and so on. Various configurations are possible and contemplated without departing from the scope of the present disclosure.

Figure 8:
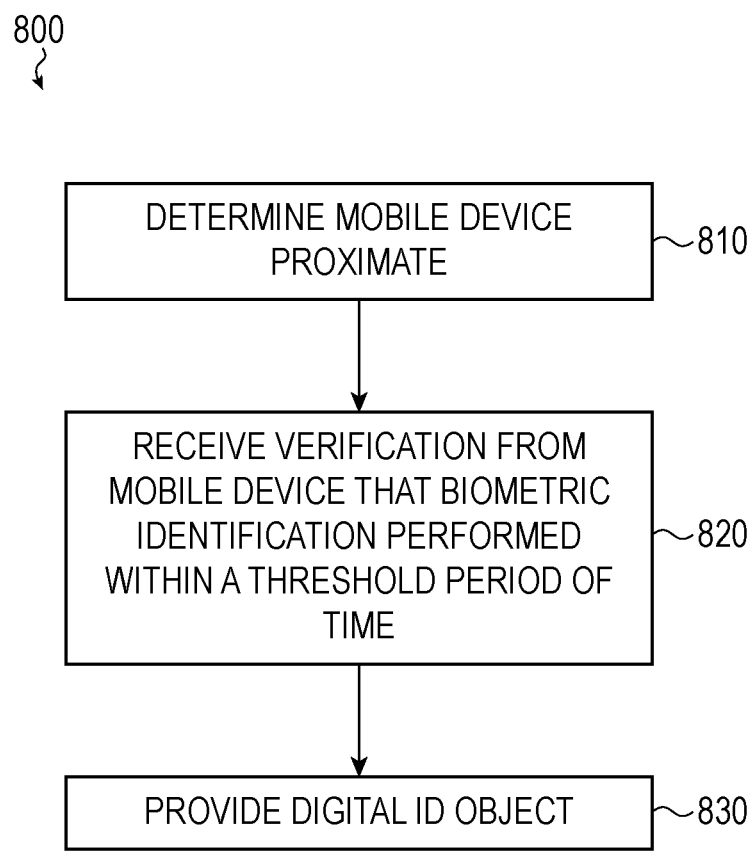
FIG. 8 is a flow chart illustrating a sixth example method for providing a digital identification generated for a checkpoint validation based on a biometric identification. The method may be performed by the system of FIG. 1A and/or FIG. 1B.

FIG. 8 is a flow chart illustrating a sixth example method 800 for providing a digital identification generated for a checkpoint validation based on a biometric identification. The method 800 may be performed by the system 100 of FIG. 1A and/or FIG. 1B.

At operation 810, an electronic device (such as the identification system backend device 101 of FIGS. 1A and/or 1B, the identification system station 102 of FIGS. 1A and/or 1B, the identification system agent device 105 of FIGS. 1A and/or 1B, and so on) may determine that a mobile electronic device is proximate (such as using geofencing, wireless communication network beacons, receipt of one or more wireless communication identifiers, and so on).

At operation 820, the electronic device may receive a verification from the mobile device that a biometric identification has been performed within a threshold period of time. At operation 830, the electronic device may provide a digital identification object (which may be generated using identity information associated with the biometric identification), such as to a checkpoint.

In various examples, this example method 800 may be implemented using a group of interrelated software modules or components that perform various functions discussed herein. These software modules or components may be executed within a cloud network and/or by one or more computing devices, such as the identification system backend device 101 of FIGS. 1A and/or 1B, the identification system station 102 of FIGS. 1A and/or 1B, the identification system agent device 105 of FIGS. 1A and/or 1B, and so on.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as receiving the verification from the mobile device. However, it is understood that this is an example. In some implementations, the method 800 may also include the additional operation of querying the mobile device for the verification. Various configurations are possible and contemplated without departing from the scope of the present disclosure.

Figure 9:
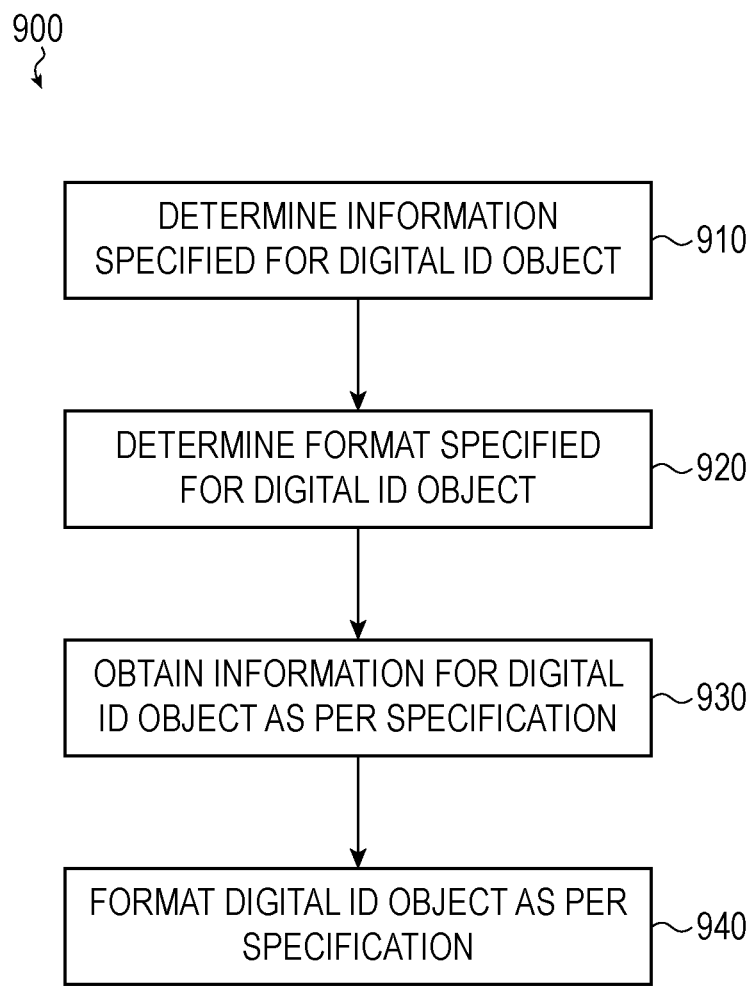
FIG. 9 is a flow chart illustrating a seventh example method for providing a digital identification generated for a checkpoint validation based on a biometric identification. The method may be performed by the system of FIG. 1A and/or FIG. 1B.

FIG. 9 is a flow chart illustrating a seventh example method 900 for providing a digital identification generated for a checkpoint validation based on a biometric identification. The method 900 may be performed by the system 100 of FIG. 1A and/or FIG. 1B.

At operation 910, an electronic device (such as the identification system backend device 101 of FIGS. 1A and/or 1B, the identification system station 102 of FIGS. 1A and/or 1B, the identification system agent device 105 of FIGS. 1A and/or 1B, and so on) may determine information specified for a digital identification object. The electronic device may use at least one specification for determining information to include in the digital identification object. The information may include one or more first names, middle names, last names, initials, addresses, state of residence, country of residence, city of residence, occupation, telephone numbers, social security numbers and/or other identification numbers, facial images and/or other images of at least a portion of the person and/or other biometric data, date of birth, month of birth, day of birth, year of birth, digital identification object generation date, digital identification object expiration date, height, eye color, hair color, gender, digital identification object classification, and so on.

At operation 920, the electronic device may determine a format specified for the digital identification object. The electronic device may use at least one specification for determining the format to use for the digital identification object. The digital identification object format may specify a sequence of packets and/or other data structures that are to be used to construct the digital identification object, a structure of where particular digital identification object information is stored in the packets and/or other data structures, identifiers and/or other metadata to include in the packets and/or other data structures that may indicate where particular digital identification object information is stored, and so on. The digital identification object format may correspond to at least one of a mobile driver's license format, a mobile state identification format, a mobile federal identification formation, a mobile governmental identification format, or a mobile passport format.

At operation 930, the electronic device may obtain information for the digital identification object as per the specification. The electronic device may obtain the information by accessing information associated with a determined identity, such as an identity associated with a biometric identification. At operation 940, the electronic device may format the digital identification object as per the specification.

In various examples, this example method 900 may be implemented using a group of interrelated software modules or components that perform various functions discussed herein. These software modules or components may be executed within a cloud network and/or by one or more computing devices, such as the identification system backend device 101 of FIGS. 1A and/or 1B, the identification system station 102 of FIGS. 1A and/or 1B, the identification system agent device 105 of FIGS. 1A and/or 1B, and so on.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 is illustrated and described as using at least one specification. However, it is understood that this is an example. In some implementations, the electronic device may conform to a standard instead of using at least one specification. Various configurations are possible and contemplated without departing from the scope of the present disclosure.

Figure 10:
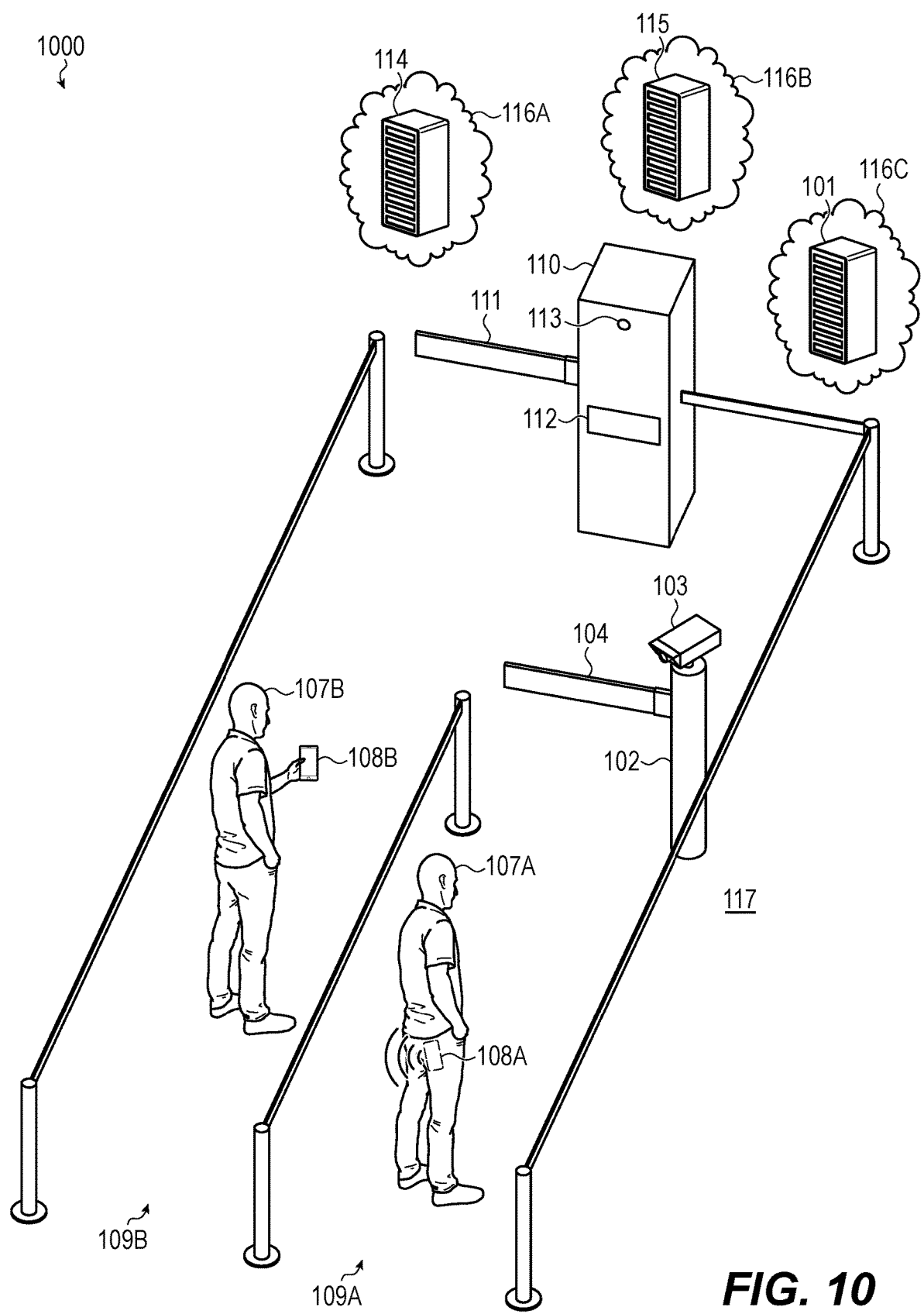
FIG. 10 depicts a second example system for providing a digital identification generated for a checkpoint validation based on a biometric identification.

FIG. 10 depicts a second example system 1000 for providing a digital identification generated for a checkpoint validation based on a biometric identification. The system 1000 is similar to the system 100 of FIGS. 1A and/or 1B, except that the agent 106 and the identification system agent device 105 are omitted. Instead, the identification system station 102 may obtain one or more biometrics for one or more people 107A, 107B, perform one or more identifications based thereon and/or cooperate with one or more other components of the system 1000 to do so, generate one or more digital identification objects and/or cooperate with one or more other components of the system 1000 to do so, and/or provide the digital identification object to the checkpoint 110 and/or cooperate with one or more other components of the system 1000 to do so. Various configurations are possible and contemplated without departing from the scope of the present disclosure.

Figure 11:
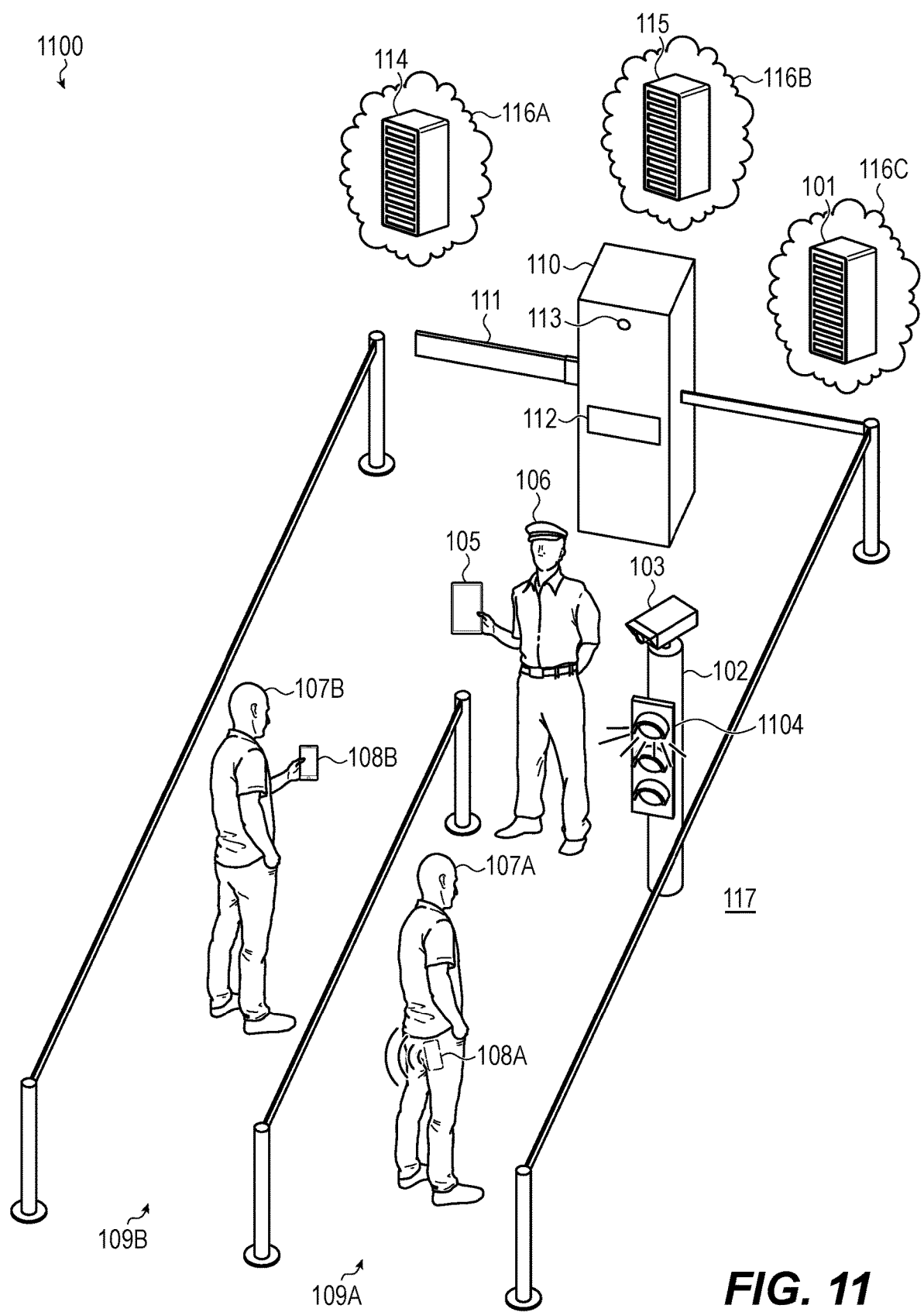
FIG. 11 depicts a third example system for providing a digital identification generated for a checkpoint validation based on a biometric identification.

FIG. 11 depicts a third example system 1100 for providing a digital identification generated for a checkpoint validation based on a biometric identification. The system 1100 is similar to the system 100 of FIGS. 1A and/or 1B, except that the access mechanism 1104 is illustrated as a set of indicator lights that may indicate whether or not access is allowed and/or denied as opposed to an automated gate that may be opened to allow access and/or kept closed to deny access. Various configurations are possible and contemplated without departing from the scope of the present disclosure.

Figure 12:
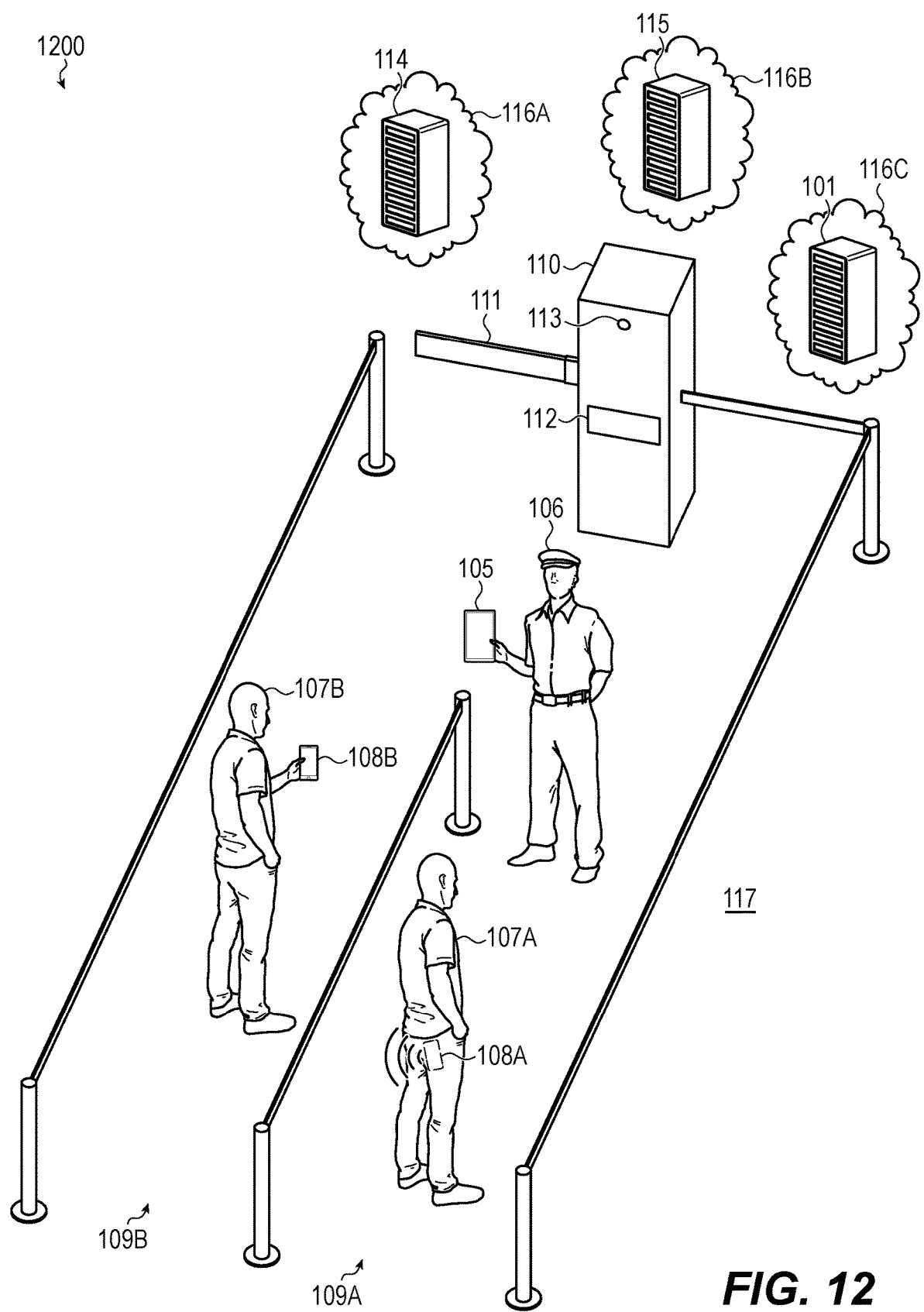
FIG. 12 depicts a fourth example system for providing a digital identification generated for a checkpoint validation based on a biometric identification.

FIG. 12 depicts a fourth example system 1200 for providing a digital identification generated for a checkpoint validation based on a biometric identification. The system 1200 is similar to the system 100 of FIGS. 1A and/or 1B, except that the identification system station 102, the access mechanism 104, and the biometric reader 103 are omitted. Instead, the agent 106 may use the identification system agent device 105 to obtain one or more biometrics for one or more people 107A, 107B and/or cooperate with one or more other components of the system 1200 to do so, perform one or more identifications based thereon and/or cooperate with one or more other components of the system 1200 to do so, generate one or more digital identification objects and/or cooperate with one or more other components of the system 1200 to do so, and/or provide the digital identification object to the checkpoint 110 and/or cooperate with one or more other components of the system 1200 to do so. Various configurations are possible and contemplated without departing from the scope of the present disclosure.

In various implementations, a system may include at least one non-transitory storage medium that stores instructions and at least one processor. The at least one processor may execute the instructions to determine that a person is located within an area, load a local biometric gallery with biometric information for the person, receive a digital representation of a biometric for the person, determine an identity for the person using the digital representation of the biometric and the local biometric gallery, generate a digital identification object for the person using identity information associated with the identity and provide the digital identification object to a checkpoint.

In some examples, the at least one processor may load the local biometric gallery with the biometric information from a main biometric gallery. In a number of such examples, the local biometric gallery may be located remote from the main biometric gallery. In various such examples, the local biometric gallery may be smaller than the main biometric gallery.

In various examples, the at least one processor may determine that the person is located within the area using geofencing. In some examples, the at least one processor may determine that the person is located within the area by determining that a mobile device associated with the person is proximate to the area. In a number of examples, the at least one processor may determine that a mobile device associated with the person is proximate to the area using a wireless communication identifier received from the mobile device.

In some implementations, a system may include at least one non-transitory storage medium that stores instructions and at least one processor. The at least one processor may execute the instructions to receive a digital representation of a biometric for a person; determine an identity for the person using the digital representation of the biometric; determine digital identification object information to be included in digital identification objects according to at least one specification; determine a digital identification object format for the digital identification objects according to the at least one specification; generate a digital identification object for the person using identity information associated with the identity, the digital identification object information, and the digital identification object format; and provide the digital identification object to a checkpoint.

In various examples, the at least one processor may store the digital identification object. In some examples, the digital identification object format may correspond to at least one of a mobile driver's license format, a mobile state identification format, a mobile federal identification formation, a mobile governmental identification format, or a mobile passport format. In a number of examples, the digital identification object may include an image of at least a portion of the person. In various examples, the digital identification object may include a name of the person. In some examples, the digital identification object may include an identification number associated with the person.

In a number of embodiments, a system may include at least one non-transitory storage medium that stores instructions and at least one processor. The at least one processor may execute the instructions to receive a digital representation of a biometric for a person, determine an identity for the person using the digital representation of the biometric, generate a digital identification object for the person using identity information associated with the identity, and provide the digital identification object to a checkpoint. In various examples, the at least one processor provides the digital identification object to the checkpoint via a checkpoint backend. In some examples, the at least one processor provides the digital identification object to the checkpoint using near-field communication. In a number of examples, the at least one processor provides the digital identification object to the checkpoint using Bluetooth®.

In some examples, determining the identity for the person may include providing biometric information to an agent electronic device where at least some of the biometric information is associated with the person and receiving an indication of the identity from the agent electronic device. In various such examples, the biometric information may include digital representations of biometrics for multiple people. In a number of such examples, the digital representation of the biometric may include at least a portion of a facial image of the person captured while the person is in motion.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to identification systems that maintain digital identities for people and use such digital identities to generate and/or provide one or more digital identification objects to one or more checkpoints. Such digital identification objects may be generated on the fly using identity information stored in association with the digital identities, stored, and so on. The identification system may generate the digital identification object in a format expected by the checkpoint, may have a trusted relationship with the checkpoint and/or may be configured to securely communicate with the checkpoint, and so on. In this way, the identification system may enable use of the automated and/or semi-automated checkpoints discussed above without requiring that people have a mobile driver's license and/or other government-issued digital identification stored on a mobile device that is capable of communicating with the automated and/or semi-automated checkpoints.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method, comprising:
   upon determining that a person is located within an area, loading a local biometric gallery with biometric information for the person;
   receiving a digital representation of a biometric for the person;
   determining an identity for the person using the digital representation of the biometric and the local biometric gallery;
   generating a digital identification object for the person using identity information associated with the identity; and
   providing the digital identification object.

2. The method of claim 1, wherein providing the digital identification object comprises transmitting the digital identification object to an electronic device.

3. The method of claim 1, wherein loading the local biometric gallery with the biometric information comprises obtaining the biometric information from a backend.

4. The method of claim 3, wherein the backend is located at a different location than the local biometric gallery.

5. The method of claim 1, wherein the identity information includes at least one of a name, an address, or an identifier.

6. The method of claim 1, wherein providing the digital identification object comprises engaging in a wireless communication.

7. The method of claim 1, further comprising determining that the person is located within the area by determining that a device associated with the person is proximate to the area using a wireless communication identifier received from the device.

8. A method, comprising:
   determining an identity for the person using a digital representation of a biometric;
   determining digital identification object information to be included in a digital identification object;
   determining a digital identification object format for the digital identification object according to at least one specification;
   generating the digital identification object for the person using identity information associated with the identity; and
   providing the digital identification object.

9. The method of claim 8, wherein determining digital identification object information to be included in a digital identification object is performed by referencing to at least one specification.

10. The method of claim 9, wherein the at least one specification is referenced by communicating with a backend.

11. The method of claim 8, wherein determining the digital identification object format for the digital identification object is performed by referencing at least one specification.

12. The method of claim 8, wherein the digital identification object format specifies at least one data structure that is used to construct the digital identification object.

13. The method of claim 8, wherein generating the digital identification object for the person using identity information associated with the identity comprises generating the digital identification object according to determined digital identification object information and a determined digital identification object format.

14. The system of claim 13, wherein the determined digital identification object format corresponds to a mobile driver's license format, a mobile state identification format, a mobile federal identification format, a mobile governmental identification format, or a mobile passport format.

15. The system of claim 8, further comprising storing the digital identification object.

16. A computer program product, comprising:
   first instructions stored in the at least one non-transitory machine readable medium and executable by at least one processor to determine an identity for a person using a digital representation of a biometric;
   second instructions stored in the at least one non-transitory machine readable medium and executable by the at least one processor to determine digital identification object information to be included in digital identification objects according to at least one specification;
   third instructions stored in the at least one non-transitory machine readable medium and executable by the at least one processor to determine a digital identification object format for the digital identification objects according to the at least one specification;
   fourth instructions stored in the at least one non-transitory machine readable medium and executable by the at least one processor to generate a digital identification object for the person using identity information associated with the identity, the digital identification object information, and the digital identification object format; and
   fifth instructions stored in the at least one non-transitory machine readable medium and executable by the at least one processor to provide the digital identification object.

17. The computer program product of claim 16, wherein the fifth instructions are further executable by the at least one processor to provide the digital identification object to an electronic device via a backend.

18. The computer program product of claim 16, wherein the fifth instructions are further executable by the at least one processor to provide the digital identification object using wireless communication.

19. The computer program product of claim 16, further comprising sixth instructions stored in the at least one non-transitory machine readable medium and executable by the at least one processor to allow access to a checkpoint.

20. The computer program product of claim 16, wherein the digital representation of the biometric comprises at least one of a fingerprint, a palm print, a retina image, an iris image, or an image of at least a portion of a face.

* * * * *